US012764223B2

(12) United States Patent
Maniwa et al.

(10) Patent No.: US 12,764,223 B2
(45) Date of Patent: Oct. 13, 2026

(54) NOTIFICATION SYSTEM, VEHICLE CONTROL DEVICE, AND NOTIFICATION METHOD

(71) Applicant: TOYOTA JIDOSHA KABUSHIKI KAISHA, Toyota (JP)

(72) Inventors: Yuta Maniwa, Susono (JP); Koichi Fujita, Toyota (JP); Jun Tohyama, Nisshin (JP); Daisuke Akaho, Nagoya (JP); Natsumi Izawa, Kariya (JP); Shunichiroh Sawai, Tokyo (JP); Masahiko Nakamura, Okazaki (JP); Kenichiro Aoki, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 18/624,535

(22) Filed: Apr. 2, 2024

(65) Prior Publication Data

US 2024/0372942 A1 Nov. 7, 2024

(30) Foreign Application Priority Data

May 1, 2023 (JP) ................................. 2023-075863
Nov. 7, 2023 (JP) ................................. 2023-190387

(51) Int. Cl.
*H04M 1/72463* (2021.01)
*B60W 50/14* (2020.01)
(Continued)

(52) U.S. Cl.
CPC ... *H04M 1/72463* (2021.01); *H04M 1/72454* (2021.01); *H04M 1/72484* (2021.01); *B60W 50/14* (2013.01)

(58) Field of Classification Search
CPC ........... H04W 4/90; H04W 4/48; H04W 4/40; H04W 4/46; H04W 4/12; H04W 88/02;
(Continued)

(56) References Cited

U.S. PATENT DOCUMENTS 9,964,950 B2 5/2018 Takano
10,017,116 B2 7/2018 Sato
(Continued)

FOREIGN PATENT DOCUMENTS

CN 110087963 A * 8/2019 ............ B60W 60/00
JP 2017-102664 A 6/2017
(Continued)

*Primary Examiner* — Lana N Le
(74) *Attorney, Agent, or Firm* — Oliff PLC

(57) ABSTRACT

PROBLEM TO BE SOLVED: To enable a driver to smoothly execute a driver action which is at least one of an operation, a reply and a confirmation by the driver and has become necessary during automatic driving even if the driver is operating a portable terminal he or she has brought into a vehicle. SOLUTION: A support system includes: an HCU and a communication apparatus used in a vehicle which performs automatic driving and has the possibility that a driver action which is at least one of an operation, a reply and a confirmation by the driver becomes necessary during automatic driving; and a portable terminal 2 which is carried by the driver and connects and communicated with the communication apparatus. The portable terminal 2 comprises: an operation determination part 202 for determining whether or not its own terminal is being operated; and a display part 210 which, when a driver action has become necessary during automatic driving and the operation determination part 202 determines that its own terminal is being operated, performs support display that supports execution of the driver action which has become necessary during automatic driving.

6 Claims, 15 Drawing Sheets

(51) Int. Cl.
*H04M 1/72454* (2021.01)
*H04M 1/72484* (2021.01)

(58) Field of Classification Search
CPC ............... H04W 48/04; H04W 68/005; H04M 1/72463; H04M 1/72454; H04M 1/72484; B60W 50/14; B60W 60/0053; B60W 60/0059; B60W 50/12; B60W 2540/215; B60W 2756/10
See application file for complete search history.

(56) References Cited

U.S. PATENT DOCUMENTS

| | | | | |
|---|---|---|---|---|
| 10,310,508 | B2 | 6/2019 | Kunisa et al. | |
| 10,452,930 | B2 | 10/2019 | Sato | |
| 10,663,973 | B2 | 5/2020 | Hashimoto et al. | |
| 10,895,875 | B2 | 1/2021 | Hashimoto et al. | |
| 11,001,198 | B2 | 5/2021 | Morimura et al. | |
| 11,275,382 | B2 | 3/2022 | Hashimoto et al. | |
| 2016/0121907 | A1* | 5/2016 | Otake | B60W 50/14 701/23 |
| 2018/0290622 | A1* | 10/2018 | Mori | H04M 1/72463 |
| 2018/0345980 | A1 | 12/2018 | Morita et al. | |
| 2019/0009739 | A1* | 1/2019 | Lisseman | B60W 50/12 |
| 2019/0126942 | A1* | 5/2019 | Goto | B60W 40/08 |
| 2019/0266878 | A1* | 8/2019 | Nakatsukasa | H04W 4/40 |
| 2020/0101977 | A1 | 4/2020 | Nakai et al. | |
| 2021/0197831 | A1* | 7/2021 | Choi | B60W 40/09 |
| 2021/0229598 | A1 | 7/2021 | Morimura et al. | |
| 2021/0380124 | A1 | 12/2021 | Urano et al. | |
| 2024/0004634 | A1* | 1/2024 | Adachi | G06F 8/65 |
| 2024/0174247 | A1* | 5/2024 | Yamaguchi | B60W 50/14 |

FOREIGN PATENT DOCUMENTS

| | | | | |
|---|---|---|---|---|
| JP | 2017-200812 | A | 11/2017 | |
| JP | 2020-102252 | A | 7/2020 | |
| KR | 102244740 | B1 * | 4/2021 | H04W 4/40 |
| WO | 2018/230527 | A1 | 12/2018 | |

* cited by examiner

32

| | | HAZARD LEVEL OF EVENT | | |
|---|---|---|---|---|
| | | LOW | MODERATE | HIGH |
| TIME-WISE IMMINENCY | LOW | LOW | LOW | MODERATE |
| | MODERATE | LOW | MODERATE | HIGH |
| | HIGH | MODERATE | HIGH | HIGH |

FIG. 5

| TYPE | CLASSIFICATION OF NOTIFICATION | EVENT ITEMS | USER ACTIONS | EXAMPLES OF URGENCY |
|---|---|---|---|---|
| 1A | WARNING OF DRIVER TAKEOVER | <IMMINENT EVENTS><br>• EXITING FROM OPERATIONAL DESIGN DOMAIN (ODD)<br>• ENCOUNTERING A DANGEROUS SITUATION<br>• SYSTEM FAILURE/MALFUNCTION<br>• SUDDEN WEATHER CHANGE<br>• LEVEL TRANSITION (LOWER)<br>• ACCIDENT | IMMEDIATE RESPONSE NEEDED | HIGH |
| 1B | NOTIFICATION OF DRIVER TAKEOVER | <PREDICTED EVENTS><br>• EXITING FROM ODD<br>• ENCOUNTERING A DANGEROUS SITUATION<br>• SYSTEM FAILURE/MALFUNCTION<br>• SUDDEN WEATHER CHANGE<br>• LEVEL TRANSITION (LOWER)<br>• ACCIDENT | RESPONSE NEEDED BY TBD | MODERATE TO HIGH |
| 2A | SYSTEM STATE TRANSITION (MRM) | • TRANSITION TO MRM | NONE<br>NOTE: USER INTERVENTION POSSIBLE | MODERATE TO HIGH |
| 2B | SYSTEM STATE TRANSITION (MRC) | • TRANSITION TO MRC | NONE | MODERATE TO HIGH |
| 3 | FUNCTION PROPOSAL FROM SYSTEM | • OVERTAKING<br>• PASSING (CHANGING LANES)<br>• LEVEL TRANSITION (UP)<br>• SELECTING ROUTE (COLLABORATION WITH AUTOMOTIVE NAVIGATION SYSTEM)<br>• DECELERATION AT TOLL BOOTH | APPROVAL | LOW TO MODERATE |
| 4 | NOTIFICATION OF STATE OF VEHICLE | • REMAINING BATTERY CHARGE<br>• REMAINING AMOUNT OF FUEL | NOTIFICATION ONLY | LOW TO MODERATE |

FIG. 11

| CLASSIFICATION | ITEMS | SPECIFIC INFORMATION | ADVANCED DRIVE SYSTEM (ADS) REACTIONS, ETC. |
| --- | --- | --- | --- |
| STATE OF PASSENGER (DRIVER) | CAMERA INFORMATION | • IMAGES OF DRIVER<br>• IMAGES IN CABIN<br>• IMAGES OUTSIDE OF VEHICLE | ESTIMATE DRIVING STATE OF DRIVER |
| | VARIOUS TYPES OF SENSOR INFORMATION | • G SENSOR<br>• YAW RATE<br>• GPS | |
| | TERMINAL OPERATION INFORMATION | • TERMINAL OPERATION TIME<br>• WEB BROWSING INFORMATION | |
| | BIOMETRIC INFORMATION | • BODY TEMPERATURE<br>• BLOOD PRESSURE<br>• PULSE<br>• ELECTRICAL SKIN RESISTANCE | ESTIMATE HEALTH STATE OF PASSENGER<br>• PROMPTING TO TAKE A BREAK<br>• EMERGENCY STOPPING, REPORTING, ETC. |
| INFORMATION INPUT | SEARCHING AND SETTING DESTINATION | | |

FIG. 21A

| AREA | FIRST NOTIFICATION INFORMATION | EVENT EXAMPLES | USER ACTIONS |
|---|---|---|---|
| A-1 | NOTIFICATION REGARDING MRM | • VEHICLE CONTROL DEVICE BECOMING DISABLED DUE TO CRITICAL MALFUNCTION<br>• BRAKE SYSTEM OR STEERING SYSTEM DISABLED<br>• TIRE BURST DETECTED<br>• HARSH SURROUNDING ENVIRONMENT DETECTED (OUTSIDE OF OPERATIONAL DESIGN DOMAIN)<br>• DIFFICULTY IN KEEPING LANE (STRONG WINDS, ETC.)<br>• ROAD UNDER WATER OR IMPASSIBLE<br>• OBJECT WITH WHICH COLLISION IS IMMINENT DETECTED | NONE |
| A-2 | DRIVER TAKEOVER REQUEST OR REQUEST FOR PREDETERMINED ACTION | • MODERATELY HARSH SURROUNDING ENVIRONMENT CONDITIONS (OUTSIDE OF OPERATIONAL DESIGN DOMAIN)<br>• EMERGENCY VEHICLE DETECTED APPROACHING<br>• TRAFFIC REGULATION OR ROAD CLOSED BY POLICE<br>• BLOCKAGE DUE TO AGGRESSIVE DRIVER<br>• SYSTEM MALFUNCTION (E.G., STEERING SYSTEM UNCONTROLLABLE, INSUFFICIENT ACCELERATION DUE TO ENGINE FAILURE OR OVERHEATING)<br>• VEHICLE CONTROL DEVICE UNCONTROLLABLE DUE TO MALFUNCTION (E.G., MAIN SENSOR FUNCTIONS STOPPED, MATCHING WITH ACTUAL ROAD CANCELLED, INFORMATION NOT TRANSMITTABLE DUE TO EQUIPMENT FAILURE)<br>• TROUBLE WITH DRIVER MONITORING CAMERA<br>• PARTIAL SYSTEM FUNCTIONALLY DEFECTIVE (E.G., REDUCED SENSOR PERFORMANCE, REDUCED PERFORMANCE OF VEHICLE CONTROL DEVICE, SENSORS DETERIORATED DUE TO SOILING OR FOGGING OF CAMERA)<br>• PROPOSAL FROM VEHICLE CONTROL DEVICE (E.G., OVERTAKING, PASSING, AUTOMATED DRIVING LEVEL TRANSITION (UP), SELECTING ROUTE (NAVIGATIONAL COOPERATION), DECELERATION AT TOLL BOOTH) | RESUME MANUAL DRIVING MODE, EXECUTE FALLBACK DRIVING TO ACHIEVE MRC |

FIG. 21B

| AREA | FIRST NOTIFICATION INFORMATION | EVENT EXAMPLES | USER ACTIONS |
|---|---|---|---|
| A-3 | PRIOR NOTIFICATION RELATING TO ENDING OF AUTOMATED DRIVING FUNCTION | <TRAVELING ENVIRONMENT CONDITIONS WILL NO LONGER BE SATISFIED IN NEAR FUTURE><br>EXAMPLES<br>• ROADWAY OBJECT DETECTED 10KM AWAY<br>• HEAVY FOG DETECTED<br>• DETECTION OF SEVERE WEATHER CHANGE WITHIN 10 MINUTES<br>• DETECTING THAT SEVERE RAIN WILL BE ENCOUNTERED IN 10 MINUTES<br>• DETECTION OF CLOSED ROAD<br>• ROAD REQUIRING WINTER TIRES / SNOW CHAINS TO TRAVEL DETECTED<br>• ROAD CONSTRUCTION SITE DETECTED<br><PARTIAL SYSTEM FAILURE CAUSING REDUCTION IN PERFORMANCE OF VEHICLE CONTROL DEVICE (OPERABLE BY BACKUP IN REDUNDANT DESIGN)><br>EXAMPLES<br>• NOT SUFFICIENT INFORMATION TO ENSURE THAT AUTOMATED DRIVING FUNCTION IS EXECUTABLE<br>• NOT CAPABLE OF EXTERNAL COMMUNICATION, AND ROAD INFORMATION OF SURROUNDINGS CANNOT BE ACQUIRED | PREPARE TO RESUME MANUAL DRIVING MODE |
| A-4 | APPROVAL REQUEST TO DRIVER | <PROPOSAL FROM VEHICLE CONTROL DEVICE><br>EXAMPLES<br>• OVERTAKING<br>• PASSING<br>• AUTOMATED DRIVING LEVEL TRANSITION (UP)<br>• SELECTING ROUTE (NAVIGATIONAL COOPERATION)<br>• DECELERATION AT TOLL BOOTH | REPLY TO PROPOSAL |
| A-5 | USEFUL INFORMATION | • FORK DETECTED 10KM AHEAD<br>• LOW FUEL / LOW CHARGE STATE DETECTED | NONE |

FIG. 23

| AREA | SECOND NOTIFICATION INFORMATION | EVENT EXAMPLES | USER ACTIONS |
|---|---|---|---|
| B-1 | NOTIFICATION THAT AUTHORITY FOR DRIVING CANNOT BE TURNED OVER TO DRIVER | <SEVERE PHYSICAL DISORDER><br>EXAMPLES<br>• STROKE<br>• HEAR ATTACK<br>• IMPAIRMENT OF CONSCIOUSNESS<br>• FAINTED<br><IMPAIRMENT OF CONSCIOUSNESS><br>EXAMPLES<br>• UNDER MEDICATION<br>• ALCOHOL<br>• DROWSINESS | PREDETERMINED OPERATIONS |
| B-2 | NOTIFICATION THAT AUTHORITY FOR DRIVING CANNOT BE TURNED OVER TO DRIVER | • MOBILE TERMINAL AND IN-CABIN SENSOR OR THE LIKE DETECTING PREDETERMINED BIOMETRIC INFORMATION OF DRIVER, SUCH AS BODY TEMPERATURE, BLOOD PRESSURE, PULSE, ELECTRICAL SKIN RESISTANCE, RESPIRATORY RATE, BEHAVIOR, AND SO FORTH<br>• MOBILE TERMINAL AND INPUT DEVICE OR THE LIKE DETECT PREDETERMINED OPERATION INFORMATION OF DRIVER SUCH AS OPERATING TIME, WEB BROWSING TIME, AND SO FORTH<br>• DETECTING ABNORMAL STATE OF DRIVER, OR RETURN TO NORMAL STATE | NONE |
| B-3 | APPROVAL OR DISAPPROVAL BY DRIVER | <REPLY TO PROPOSAL FROM VEHICLE CONTROL DEVICE><br>EXAMPLES<br>• OVERTAKING<br>• PASSING<br>• AUTOMATED DRIVING LEVEL TRANSITION<br>• SELECTING ROUTE (NAVIGATIONAL COOPERATION) | REPLY TO PROPOSAL |

NOTIFICATION SYSTEM, VEHICLE CONTROL DEVICE, AND NOTIFICATION METHOD

CROSS-REFERENCE TO RELATED APPLICATION

This application claims priority to Japanese Patent Application No. 2023-075863 filed on May 1, 2023 and Japanese Patent Application No. 2023-190387 filed on Nov. 7, 2023, each incorporated herein by reference in its entirety.

BACKGROUND

1. Technical Field

The present disclosure relates to a notification system, a vehicle control device, and a notification method.

2. Description of Related Art

Japanese Unexamined Patent Application Publication No. 2020-102252 (JP 2020-102252 A) discloses a driver monitoring system that monitors a driver of a vehicle by communication being performed between a mobile terminal and a vehicle control device that controls the vehicle.

SUMMARY

According to conditional automated driving, a situation is assumed in which a driver of a vehicle is temporarily relieved of the duty to pay attention to the road ahead, and is able to perform tasks other than driving operations, such as operating a mobile terminal such as a smartphone, and so forth. In this case, the driver is required to be able to return to driving operations at any time in response to a request from the vehicle system. As such, using a mobile terminal to transmit notifications and requests from a vehicle-side system to the driver is conceivably effective. However, when the driver is notified of all notifications in the same way, the driver may find the notifications bothersome and lose interest in the notifications, leading to a likelihood of overlooking important notifications relating to the vehicle more readily.

The present disclosure provides a notification system, a vehicle control device, a notification method, and a program that can suppress a driver of a vehicle from overlooking important notifications relating to the vehicle.

A notification system according to a first aspect includes a mobile terminal configured to receive, and to perform notification of, notification information regarding a vehicle, and a vehicle control device that is configured to generate the notification information for a driver of the vehicle, and to transmit the notification information to the mobile terminal. The vehicle control device includes one or more processors configured to perform control in which notification of the notification information is made to the mobile terminal, while varying a range of the mobile terminal that is controllable by the driver until a predetermined condition is satisfied, in accordance with an urgency of the notification information.

According to the notification system of the first aspect, notification of the notification information is made to the mobile terminal while varying the range of the mobile terminal that is controllable by the driver until the predetermined condition is satisfied, in accordance with the urgency of the notification information. Accordingly, the driver can recognize the importance of the notification information, and consequently, the driver can be suppressed from overlooking important notifications.

In the notification system according to the above aspect, the urgency may be determined depending on whether the notification information is information that requires the driver to respond.

According to the notification system of the above aspect, the driver can be suppressed from overlooking notifications that require the driver to respond.

In the notification system according to the above aspect, the urgency may be determined in accordance with a hazard level of an event.

According to the notification system of the above aspect, the driver can be suppressed from overlooking notifications relating to events with a high hazard level.

In the notification system according to the above aspect, the one or more processors may be configured to, with respect to notification information of which the urgency is no less than a certain level, perform control of making notification of the notification information while controlling the mobile terminal to a state such that the mobile terminal is inoperable by the driver until a vehicle operation is performed by the driver.

According to the notification system of the above aspect, the driver of the vehicle can be more effectively suppressed from overlooking important notifications relating to the vehicle.

In the notification system according to the above aspect, the one or more processors may be configured to, with respect to notification information of which the urgency is no less than a certain level, perform control of making notification of the notification information while controlling the mobile terminal to a state such that a confirmation button is displayed on a display device of the mobile terminal, and the mobile terminal is inoperable except for an operation of pressing the confirmation button, until the driver presses the confirmation button.

According to the notification system of the above aspect, the driver of the vehicle can be more effectively suppressed from overlooking important notifications relating to the vehicle.

In the notification system of the above aspect, the one or more processors may be configured to make notification on the mobile terminal, in accordance with an order of priority regarding first notification information generated at the mobile terminal and second notification information that is notification information relating to the vehicle.

According to the notification system of the above aspect, the driver of the vehicle can be more effectively suppressed from overlooking important notifications relating to the vehicle and important notifications occurring at the mobile terminal.

A vehicle control device according to a second aspect includes one or more processors configured to acquire notification information relating to a vehicle, the notification information being transmitted toward a mobile terminal held by a driver of the vehicle, and perform control to make notification to the mobile terminal regarding the notification information while varying a range of the mobile terminal that is controllable by the driver until a predetermined condition is satisfied, in accordance with an urgency of the notification information.

A notification method according to a third aspect is executed by a computer that makes up a notification system including a mobile terminal configured to receive, and to perform notification of, notification information regarding a vehicle, and a vehicle control device that generates the notification information for a driver of the vehicle, and transmits the notification information to the mobile terminal, the notification method including performing control to make notification to the mobile terminal regarding the notification information while varying a range of the mobile terminal that is controllable by the driver until a predetermined condition is satisfied, in accordance with an urgency of the notification information.

As described above, according to the present disclosure, the driver of the vehicle can be suppressed from overlooking important notifications relating to the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 5 is a diagram showing an example of notification information, events, user actions, and urgency;

FIG. 11 shows an example of information provided from the mobile terminal to a vehicle;

FIG. 21A is a diagram showing first notification information corresponding to each area of A-1 to A-2 in FIG. 20, examples of events regarding which notification of the first notification information is made, and examples of user actions that are required in response to the first notification information that is notified thereto;

FIG. 21B is a diagram showing first notification information corresponding to each area of A-3 to A-5 in FIG. 20, examples of events regarding which notification of the first notification information is made, and examples of user actions that are required in response to the first notification information that is notified thereto;

FIG. 23 is a diagram showing second notification information corresponding to each area of B-1 to B-3 in FIG. 22, examples of events regarding which notification of the second notification information is made, and examples of user actions at the time of making notification of the second notification information.

DETAILED DESCRIPTION OF EMBODIMENTS

Embodiments for carrying out the present disclosure will be described below in detail with reference to the drawings.

First Embodiment

Figure 1:
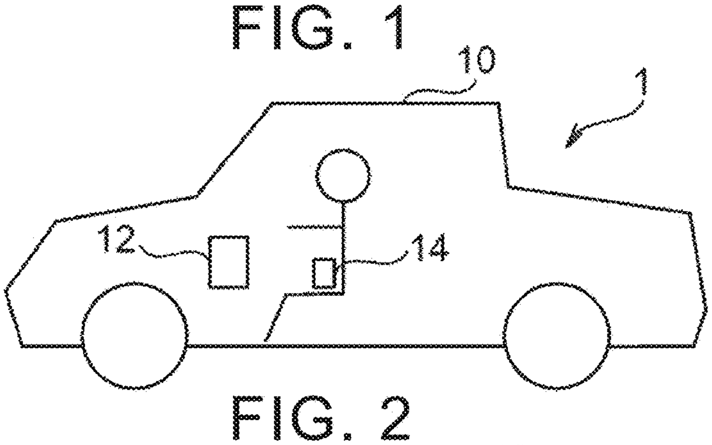
FIG. 1 is a schematic diagram illustrating an example of a configuration of a notification system.

First, the configuration of a notification system 1 according to a first embodiment will be described with reference to FIG. 1. As illustrated in FIG. 1, the notification system 1 includes a vehicle control device 12 provided inside the vehicle 10, and a mobile terminal 14 possessed by a driver and carried into the vehicle 10 by the driver. An example of the vehicle control device 12 is a computer such as an electronic control unit (ECU) or the like. Examples of the mobile terminal 14 include a computer such as a smartphone, a tablet terminal, a smart watch, or the like. The vehicle control device 12 according to the present embodiment is applied to an automated driving vehicle that enables switching between automated driving and manual driving.

The mobile terminal 14 can receive and make notification of notification information regarding the vehicle 10. The vehicle control device 12 generates notification information for the driver of vehicle 10, and performs transmission thereof to the mobile terminal 14. This notification information is information that is notified to the driver during execution of automated driving.

Figure 2:
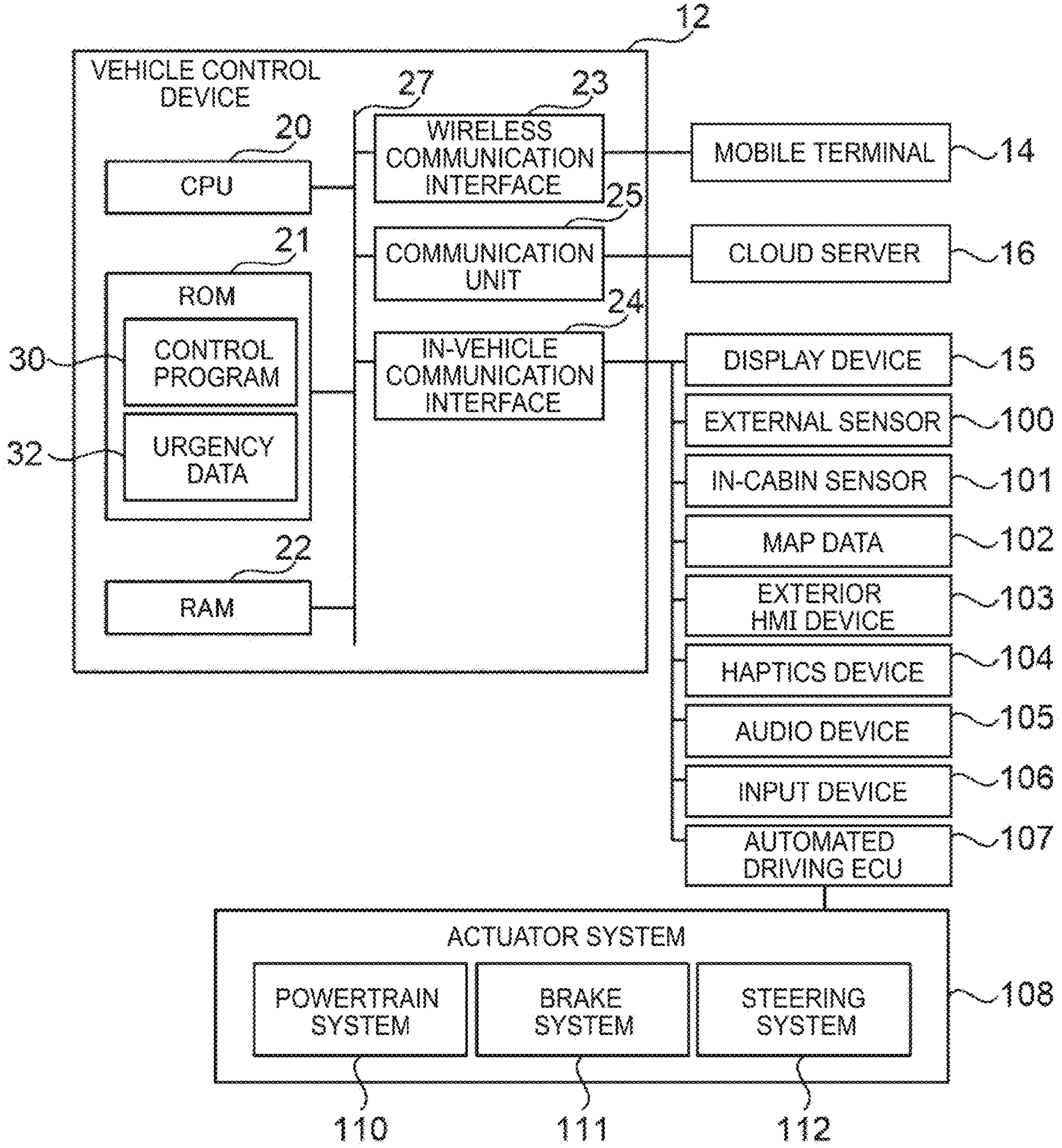
FIG. 2 is a block diagram illustrating an example of a hardware configuration of a vehicle control device.

Next, a hardware configuration of the vehicle control device 12 according to the present embodiment will be described with reference to FIG. 2. The vehicle control device 12 includes a central processing unit (CPU) 20, read-only memory (ROM) 21, random-access memory (RAM) 22, a wireless communication interface 23, an in-vehicle communication interface 24, and a communication unit 25. The CPU 20, the ROM 21, the RAM 22, the wireless communication interface 23, the in-vehicle communication interface 24, and the communication unit 25 are connected to each other via a bus 27 so as to be mutually communicable.

The CPU 20 is a central processing unit that executes various programs and controls various parts. That is to say, the CPU 20 reads programs from the ROM 21 and executes the programs using the RAM 22 as a work area.

The ROM 21 serves as a storage unit, and stores various types of programs and various types of data. In the present embodiment, the ROM 21 stores a control program 30 and urgency data 32. The RAM 22 serves as a work area, and temporarily stores programs and data.

The wireless communication interface 23 is an interface for connecting to the mobile terminal 14 by wireless communication. Note that in the present embodiment, a configuration in which the vehicle control device 12 and the mobile terminal 14 directly communicate will be described as an example, but the disclosed technology is not limited to this form. For example, a form may be made in which the vehicle control device 12 and the mobile terminal 14 communicate with each other via a server computer or the like provided on a network.

The in-vehicle communication interface 24 is an interface for connecting with in-vehicle equipment, such as a display device 15, an external sensor 100, an in-cabin sensor 101, map data 102, an exterior human-machine interface (HMI) device 103, a haptics device 104, an audio device 105, an input device 106, an automated driving ECU 107, and so forth. The interface uses a communication standard conforming to the Controller Area Network (CAN) protocol.

The communication unit 25 is an interface for connecting to a network when communicating with an external server such as a cloud server 16 or the like. A communication standard such as long-term evolution (LTE) or the like, for example, is used for this interface. The vehicle control device 12 can also communicate with the mobile terminal 14 via the cloud server 16.

The display device 15 displays messages under control of the vehicle control device 12. An example of the display device 15 is a liquid crystal display provided in an instrument panel.

The external sensor 100 includes various types of sensors, such as a camera, a radar device, a millimeter-wave radar device, and so forth, that acquire various types of information regarding the surrounding environment of the vehicle 10. The in-cabin sensor 101 includes various types of sensors, such as a driver monitoring camera and so forth, that acquire various types of information inside of a vehicle cabin. The map data 102 is provided from an automotive navigation system or the like. The exterior HMI device 103 outputs various types of signals to people outside the vehicle, such as pedestrians, cyclists, and so forth. The haptics device 104 provides tactile feedback to occupants of the vehicle 10 by applying force, vibrations, movement, and so forth, to the occupants, by way of a device that causes vibrations of seatbelts, or the like. The audio device 105 includes an audio output device, such as a speaker or the like. The input device 106 is a device made up of various types of switches, touch sensors, and so forth, for input to be performed by the occupants of the vehicle 10.

The automated driving ECU 107 controls automated driving of the vehicle 10. Note that the term "automated driving" as used in the present embodiment means, as an example, automated driving in which the vehicle 10 is the primary entity that performs driving, and means automated driving at a level of automated driving Level 3 or higher, as defined by the Society of Automotive Engineers (SAE). The automated driving ECU 107 is configured to be capable of automated driving processing of Level 3 or higher. The automated driving ECU 107 is connected to an actuator system 108. The actuator system 108 includes a powertrain system 110, a brake system 111, and a steering system 112. The automated driving ECU 107 controls the powertrain system 110, the brake system 111, and the steering system 112.

The powertrain system 110 includes a powertrain capable of generating driving force to drive driving wheels of the vehicle 10, and an ECU that controls actions of the powertrain. The brake system 111 includes a plurality of braking devices, provided at each wheel of the vehicle 10. The braking devices include, for example, a hydraulic brake such as a disc brake that generates braking force using hydraulic pressure. The steering system 112 includes a steering device that can change a steering angle of steered wheels of the vehicle 10, and an ECU that controls actions of the steering device.

Figures 3, 4:
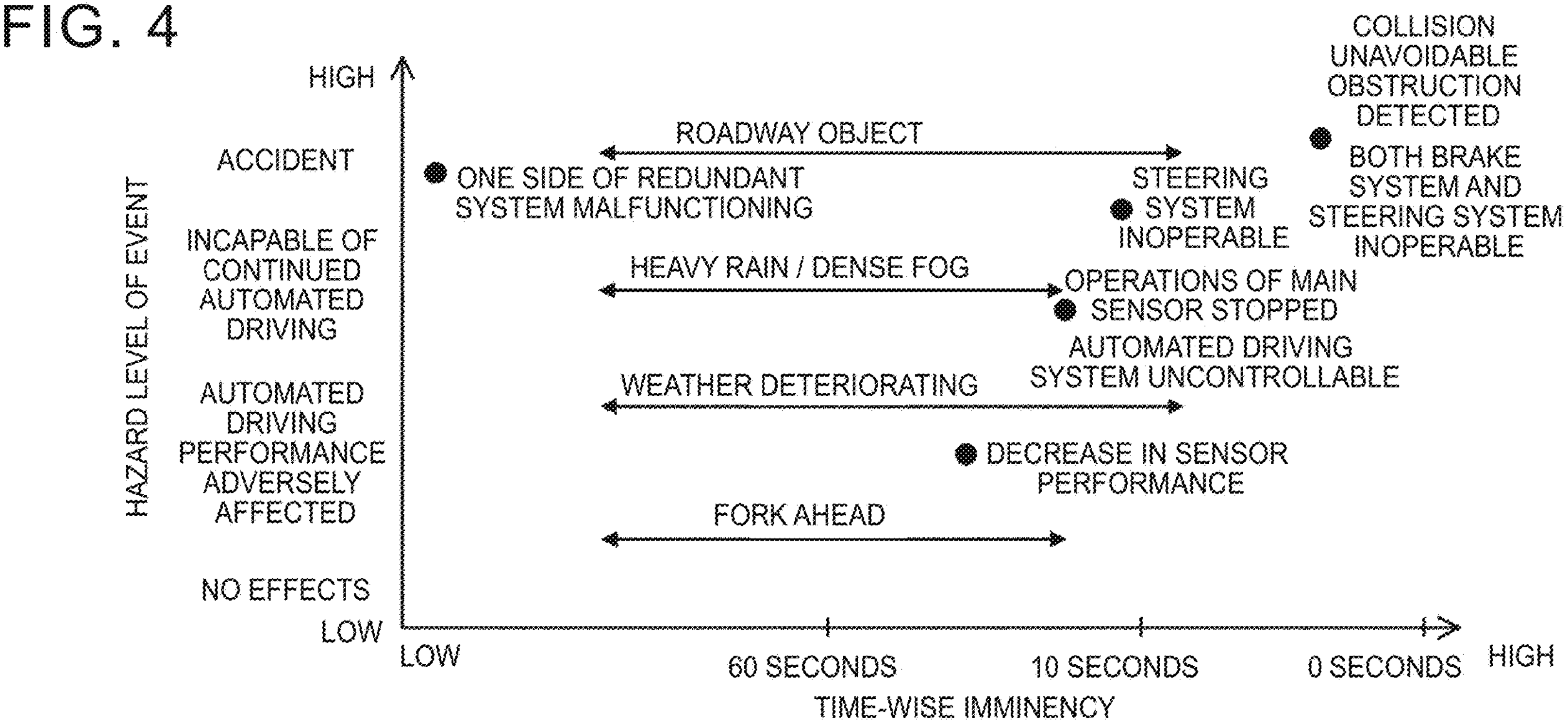
FIG. 3 is a diagram showing an example of urgency data.
FIG. 4 is a diagram showing an example of urgency.

FIG. 3 shows an example of urgency data 32. As shown in FIG. 3, the urgency data 32 includes urgency of notification information (hereinafter simply referred to as "urgency"), which is stored correlated with a combination of time-wise imminency until the driver responds, and a hazard level of an event. This urgency represents the urgency of the response of the driver during execution of automated driving. In the present embodiment, the higher the time-wise imminency is, the higher the urgency is, and the higher the hazard level of an event is, the higher the urgency is.

For example, as shown in FIG. 3, when the time-wise imminency is low and the hazard level of the event is low, the urgency is low. Also, when the time-wise imminency is low and the hazard level of the event is moderate, the urgency is low. Also, when the time-wise imminency is low and the hazard level of the event is high, the urgency is moderate. Thus, in the present embodiment, when the time-wise imminency is low and the hazard level of the event is low, as one example, the urgency is low, in the same way as with the time-wise imminency and the hazard level of the event. Also, in the present embodiment, when the time-wise imminency is low and the hazard level of the event is moderate, as one example, the degree of time-wise imminency is applied, and the urgency is low. Also, in the present embodiment, when the time-wise imminency is low and the hazard level of the event is high, as one example, the urgency is moderate, halfway between the time-wise imminency and the hazard level of the event.

For example, as shown in FIG. 3, when the time-wise imminency is moderate and the hazard level of the event is low, the urgency is low. Also, when the time-wise imminency is moderate and the hazard level of the event is moderate, the urgency is moderate. Also, when the time-wise imminency is moderate and the hazard level of the event is high, the urgency is high. Thus, in the present embodiment, when the time-wise imminency is moderate and the hazard level of the event is low, as one example, the degree of the hazard level of the event is applied, and the urgency is low. Also, in the present embodiment, when the time-wise imminency is moderate and the hazard level of the event is moderate, as one example, the urgency is moderate, in the same way as with the time-wise imminency and the hazard level of the event. Also, in the present embodiment, when the time-wise imminency is moderate and the hazard level of the event is high, as one example, the degree of the hazard level of the event is applied, and the urgency is high.

For example, as shown in FIG. 3, when the time-wise imminency is high and the hazard level of the event is low, the urgency is moderate. Also, when the time-wise imminency is high and the hazard level of the event is moderate, the urgency is high. Also, when the time-wise imminency is high and the hazard level of the event is high, the urgency is high. Thus, in the present embodiment, when the time-wise imminency is high and the hazard level of the event is low, as one example, the urgency is moderate, halfway between the time-wise imminency and the hazard level of the event. Also, in the present embodiment, when the time-wise imminency is high and the hazard level of the event is moderate, as one example, the degree of time-wise imminency is applied, and the urgency is high. Also, in the present embodiment, when the time-wise imminency is high and the hazard level of the event is high, as one example, the urgency is high, in the same way as with the time-wise imminency and the hazard level of the event.

In the example of FIG. 3, the urgency is divided into three stages, but the urgency may be divided into two stages, or may be divided into four or more stages. Also, in the example of FIG. 3, the time-wise imminency is divided into three stages, but the time-wise imminency may be divided into two stages, or may be divided into four or more stages. Also, in the example of FIG. 3, the hazard level of the event is divided into three stages, but the hazard level of the event may be divided into two stages, or may be divided into four or more stages. Also, the urgency may be correlated just with the hazard level of the event. Also, the urgency may be determined depending on whether the notification information regarding the vehicle is information that requires the driver to respond. For example, notification information that requires the driver to respond is set to "moderate" or "high" urgency, and notification information that does not require the driver to respond is set to "low" urgency.

As shown in FIG. 4 as an example, the hazard level of an event is determined in accordance with weather conditions, obstructions, the state of each part making up the vehicle 10, information regarding a roadway, and so forth. The vertical axis in FIG. 4 indicates the hazard level of the event, and the horizontal axis in FIG. 4 indicates the time-wise imminency. For example, in FIG. 4, hazard levels of events are ordered from low to high as follows: an event that does not affect traveling of the vehicle 10, an event that adversely affects automated driving performance of the vehicle 10, an event that renders continued automated driving of the vehicle 10 impossible, and an accident event of the vehicle 10. In the case of a failure of the parts making up the vehicle 10, the time-wise imminency is determined in accordance with the degree of failure. Also, there are events in which the time-wise imminency is set in accordance with the amount of time until the event occurs, such as a collision with an obstruction, a change in weather, reaching a fork in the roadway, and so forth.

The hazard level of the event and the time-wise imminency are determined based on the situation of the vehicle, the situation of the surroundings, and so forth, which are acquired, and the urgency is correlated on a map as shown in FIG. 4, as one example. The urgency regarding this event changes from as appropriate, based on changes in the situation of the vehicle and the situation of the surroundings. For example, when dealing with roadway objects, changes in the weather, roadway forks, and so forth, the time-wise imminency increases as the vehicle travels and nears the object (i.e., there is less time to spare). For example, assumption will be made that the vehicle control device 12 detects an occurrence of an event that will render automated driving of the vehicle 10 impossible to continue (e.g., heavy rain or dense fog). In this case, as an example, whether there is leeway in time of around 10 to 20 seconds until the event occurs is set as one of boundaries between moderate and high imminency. That is to say, the value of around 10 to 20 seconds until the occurrence of the event is one of the boundaries between moderate and high urgency. As an example, whether there is leeway in time of around 60 to 180 seconds until the event occurs is set as one of the boundaries between low and moderate imminency. That is to say, the value of around 60 to 180 seconds until the occurrence of the event is one of the boundaries between low and moderate urgency.

FIG. 5 shows an example of classification of notification information, events, user actions as to the notification information, and urgency.

As shown in FIG. 5, the classification of notification information according to type 1A is a warning for driver takeover. Also, an event item regarding which notification of this notification information is made is an "imminent event", such as exiting from an operational design domain (ODD), or encountering a dangerous situation. For example, when the vehicle control device 12 detects exiting from the operational design domain, notification of this notification information is made. The user, specifically, the driver, at this time needs to immediately respond to the notification information, in order to resume the manual driving mode. Also, the urgency of this notification information is high.

As shown in FIG. 5, the classification of notification information according to type 1B is a notification for driver takeover. Also, an event item regarding which notification of this notification information is made is a "predicted event" such as a system failure or malfunction, or a sudden change in weather. For example, when the vehicle control device 12 detects a system failure, the notification of this notification information is made. In response to this notification information, the driver needs to take measures to resume the manual driving mode by a determined cutoff time (to be determined (TBD)), specifically, by the time that the driver takeover is decided upon. Also, the urgency of this notification information is moderate to high.

As shown in FIG. 5, the classification of notification information according to type 2A is system state transition (minimal risk maneuver (MRM)). Also, an event item regarding which notification of this notification information is made is transitioning to an MRM. For example, when the vehicle control device 12 decides to transition to an MRM, the notification of this notification information is made. The action of the driver required for this notification information is "none". That is to say, the driver does not need to take any action when notification of this notification information is made. Also, the urgency of this notification information is moderate to high. Note that as an alternative arrangement, the driver may be requested to take some sort of action when this notification of this notification information is made.

As shown in FIG. 5, the classification of notification information according to type 2B is system state transition (minimal risk condition (MRC)). Also, an event item regarding which notification of this notification information is made is transitioning to an MRC. For example, when the vehicle control device 12 decides to transition to an MRC, the notification of this notification information is made. The action of the driver required for this notification information is "none". That is to say, the driver does not need to take any action when notification of this notification information is made. Also, the urgency of this notification information is moderate to high.

As shown in FIG. 5, the classification of notification information according to type 3 is a function proposal from the system. Also, an event item for which the notification information is notified is a function proposal from the system, such as overtaking or passing (changing lanes), or the like. For example, when the vehicle control device 12 proposes execution of overtaking, notification of this notification information is made. The driver then needs to approve execution of the proposed function in response to this notification information. Also, the urgency of this notification information is low to moderate.

As shown in FIG. 5, the classification of notification information according to type 4 is a notification of vehicle state. Also, the item of the event for which the notification information is notified is the remaining battery charge or remaining fuel. For example, when the vehicle control device 12 detects a predetermined remaining battery charge, notification of this notification information is made. This notification information is only a notification, and action of the driver required for this notification information is "none". That is to say, the driver does not need to take any action when notification of this notification information is made. Also, the urgency of this notification information is low to moderate.

Figure 6:
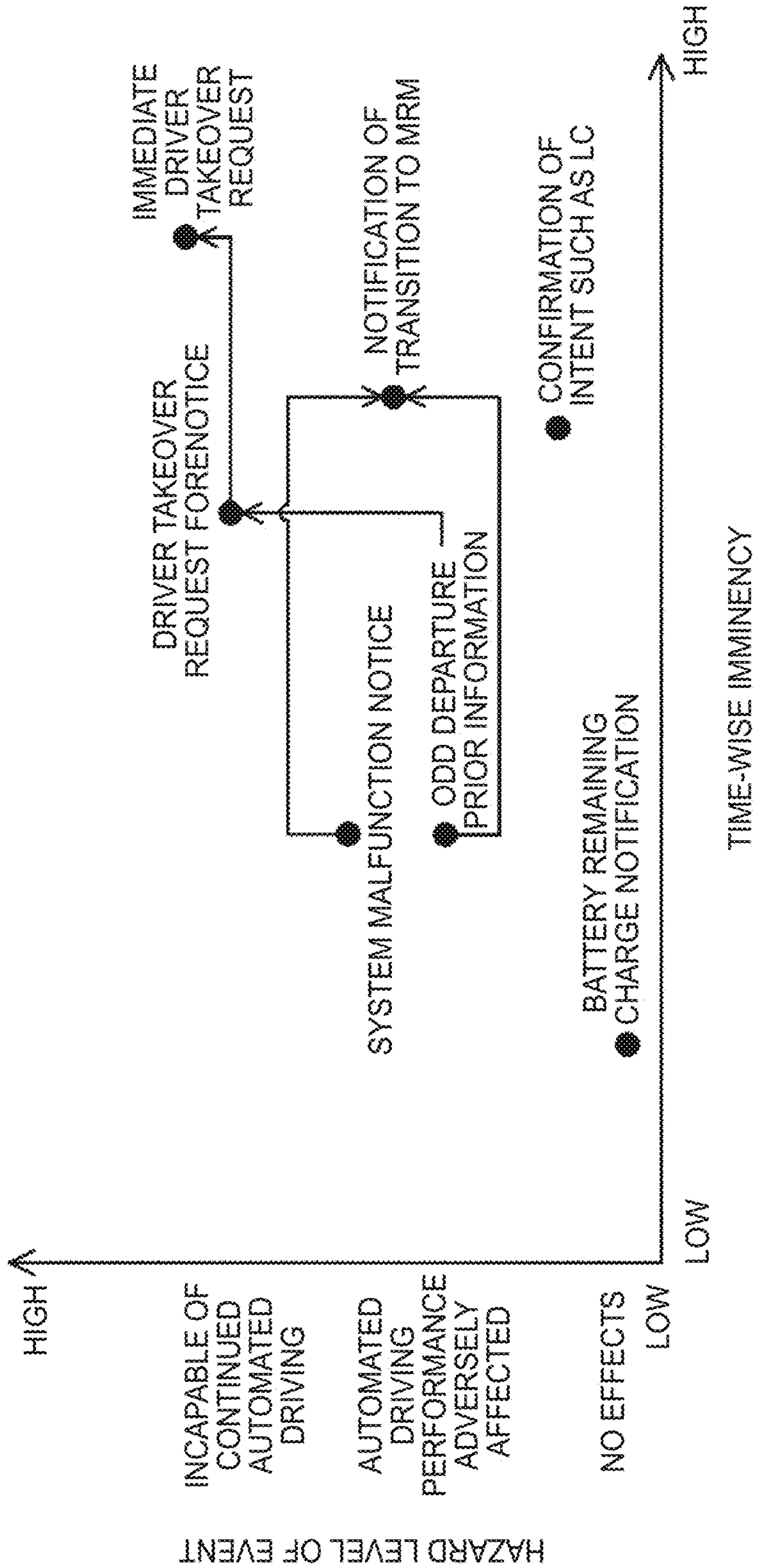
FIG. 6 is a diagram showing an example of relationship among events.

FIG. 6 is a diagram showing an example of relationship among events. For example, as shown in FIG. 6, "notification of system failure" and "notification of transition to MRM" are mutually related. Specifically, "notification of transition to MRM" is connected to by an arrow extending from "notification of system failure". In this case, the vehicle control device 12 makes notification of a "notification of system failure" as notification information, and thereafter makes notification of a "notification of transition to MRM" as related notification information when the time-wise imminency becomes high.

Figure 7:
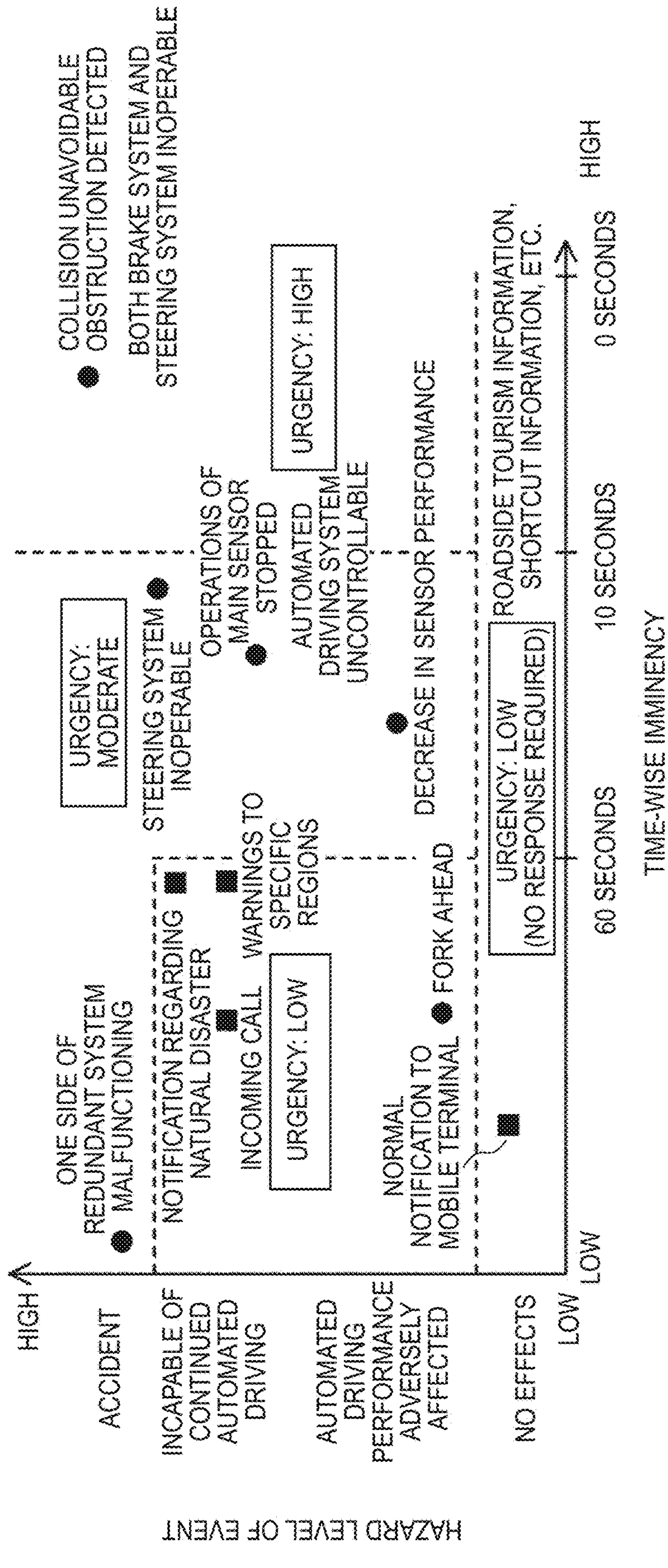
FIG. 7 is a diagram showing an example of urgency of notifications on a mobile terminal side.

Further, FIG. 7 shows an example of urgency of notification on the mobile terminal 14 side, corresponding to FIG. 4. In FIG. 7, urgency of the notification on the mobile terminal 14 side is represented by black rectangles. In FIG. 7, urgency of the notification on the vehicle 10 side is represented by black circles. Also, dashed straight lines in FIG. 7 represent boundaries of urgencies.

As an example, in FIG. 7, low (no response required) and low are provided as the urgency of the notification on the mobile terminal 14 side. The urgency of low is higher than the urgency of low (no response required). For example, urgency of low (no response required) includes normal notifications at the mobile terminal 14, such as decrease in remaining battery charge, schedule notifications, and so forth. No response by the driver is required for urgency of low (no response required). Urgency of low, for example, includes an incoming call to the mobile terminal 14. In response to an incoming call to the mobile terminal 14 with urgency of low, the driver may conceivably respond by answering the call, hanging up the call, or the like.

As an example, in FIG. 7, urgencies of low, moderate, and high levels, for notification on the vehicle 10 side, are provided. With respect to this urgency, levels increase in the order of low, moderate, and high. For example, urgency of low includes "fork ahead", that makes notification of the presence of a fork in the travel route of the vehicle 10. For example, urgency of moderate includes "sensor performance decrease" that notifies that the performance of a sensor of the vehicle 10 has decreased or will decrease. For example, urgency of high includes "collision-unavoidable obstruction detected" that makes notification of the presence of an obstruction regarding which collision with the vehicle 10 is unavoidable.

Figure 8:
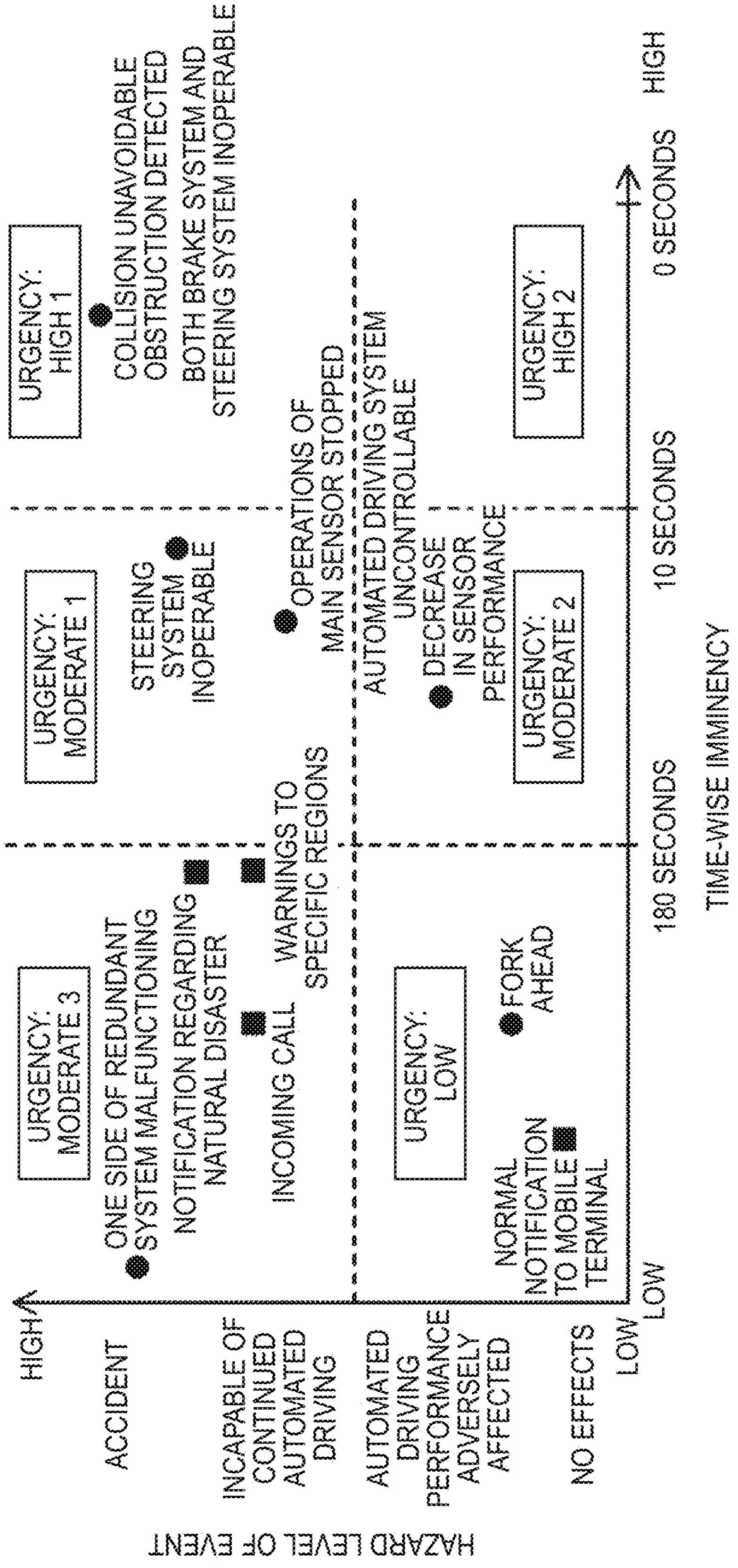
FIG. 8 is a diagram showing an example of a case in which urgency is divided into six levels.

Further, FIG. 8 shows an example in which the urgency corresponding to FIG. 7 is divided into six levels. In FIG. 8, urgency increases in the order of the levels of low, moderate 3, moderate 2, moderate 1, high 2, and high 1. However, the levels of urgency are not limited to this in particular, and can be set as appropriate.

Figure 9:
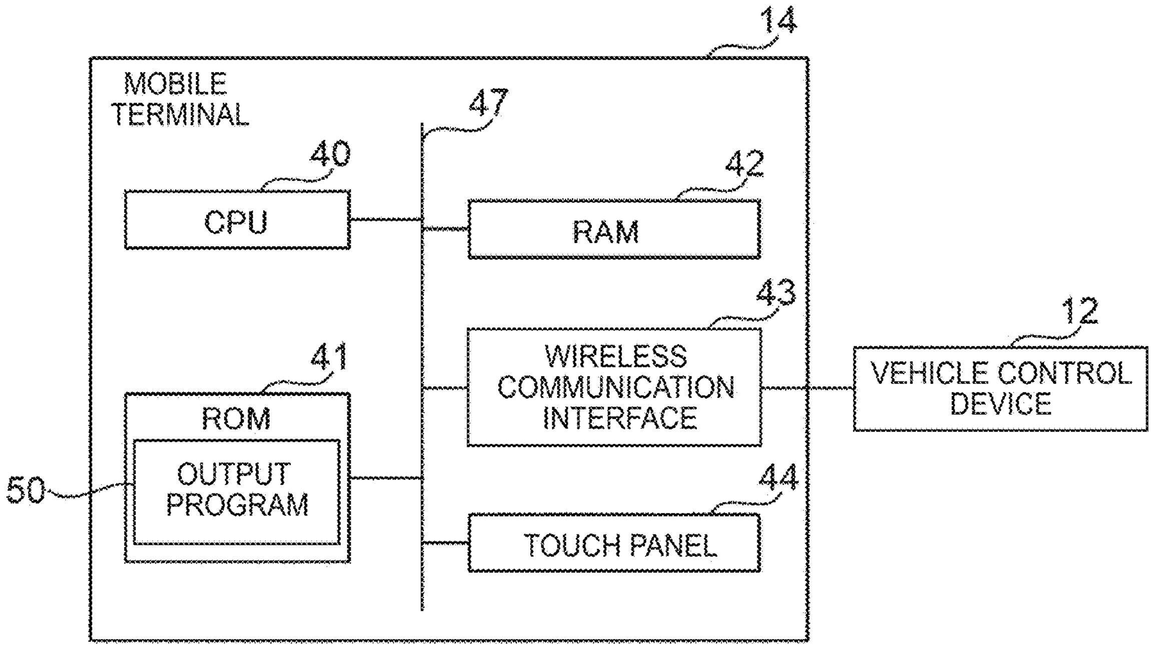
FIG. 9 is a block diagram illustrating an example of a hardware configuration of a mobile terminal.

Next, a hardware configuration of the mobile terminal 14 according to the present embodiment will be described with reference to FIG. 9. The mobile terminal 14 includes a CPU 40, ROM 41, RAM 42, a wireless communication interface 43, and a touch panel 44. The CPU 40, the ROM 41, the RAM 42, the wireless communication interface 43, and the touch panel 44 are connected to each other via a bus 47 so as to be mutually communicable.

The CPU 40 is a central processing unit that executes various types of programs and controls various parts. That is to say, the CPU 40 reads programs from the ROM 41 and executes the programs using the RAM 42 as a work area.

The ROM 41 serves as a storage unit, and stores various types of programs and various types of data. In the present embodiment, an output program 50 is stored in the ROM 41. The RAM 42 serves as a work area, and temporarily stores programs and data.

The wireless communication interface 43 is an interface for connecting to the vehicle control device 12 by wireless communication. The touch panel 44 includes a liquid crystal display serving as a display device, and a touch sensor serving as an input device.

Figure 10:
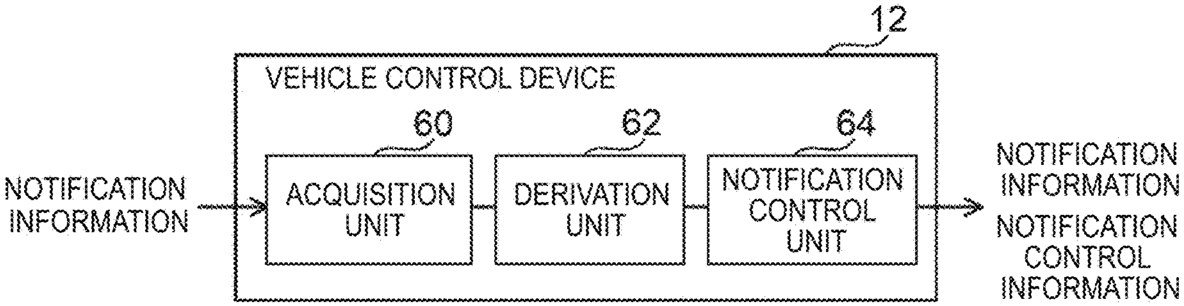
FIG. 10 is a block diagram illustrating an example of a functional configuration of the vehicle control device.

Next, a functional configuration of the vehicle control device 12 according to the present embodiment will be described with reference to FIG. 10. As illustrated in FIG. 10, the vehicle control device 12 includes an acquisition unit 60, a derivation unit 62, and a notification control unit 64. The CPU 20 functions as the acquisition unit 60, the derivation unit 62, and the notification control unit 64, by executing programs stored in the ROM 21. Note that the notification control unit 64 may be provided in the mobile terminal 14, or in the cloud server 16. The notification control unit 64 may be provided in a plurality out of the vehicle control device 12, the mobile terminal 14, and the cloud server 16.

The acquisition unit 60 acquires notification information regarding the vehicle 10. For example, the acquisition unit 60 acquires various types of information as notification information, such as information from the external sensor 100, information from the in-cabin sensor 101, surroundings information from the automotive navigation system and the map data 102, information that can be acquired via the communication unit 25 and the mobile terminal 14, and so forth. Alternatively, notification information generated by another ECU such as the automated driving ECU 107 or the like that has acquired this information, is acquired via the in-vehicle communication interface 24.

FIG. 11 shows an example of information provided from the mobile terminal 14 to the vehicle 10. As shown in FIG. 11, the information is classified into a state of the occupant (driver), and information input. Here, an item regarding the state of the driver includes camera information showing images of at least one of the driver, inside of the vehicle cabin, and outside of the vehicle, biometric information such as the body temperature, blood pressure, pulse, electrical skin resistance, and so forth, of the driver, and so forth. Based on the above camera information provided from the mobile terminal 14, an advanced drive system (ADS) of the vehicle 10, specifically the vehicle control device 12, can estimate the driving state of the driver, such as whether the authority for driving can be turned over to the driver. Also, based on the above biometric information provided from the mobile terminal 14, the vehicle control device 12 estimates the health state of the driver, and can react by "prompting to take a break", "bringing the vehicle 10 to an emergency stop", or the like. Note that the vehicle control device 12 estimates the driving state and the health condition of the driver using known processing as appropriate. Also, among these classifications of information, information input items include destination searching, destination setting, and so forth, for the vehicle 10.

Returning to FIG. 10, the derivation unit 62 derives the time-wise imminency for the driver to respond while automated driving is being executed, based on the notification information acquired by the acquisition unit 60. For example, when the notification information includes a time limit such as "YY seconds left until XX", the derivation unit 62 uses the time limit to derive the time-wise imminency. The derivation unit 62 according to the present embodiment derives one of low, moderate, and high, as time-wise imminency, based on the time limit and two threshold values TH1 and TH2 (TH1<TH2). The derivation unit 62 derives "high" as the time-wise imminency when the time limit is no greater than the threshold value TH1, derives "moderate" as the time-wise imminency when the time limit exceeds the threshold value TH1 and is no greater than the threshold value TH2, derives "low" as the time-wise imminency when the time limit exceeds the threshold value TH2. For example, the threshold value TH1 is set to 10 seconds, and the threshold value TH2 is set to 60 seconds.

Also, for example, when the notification information includes a distance such as "YY km to XX", the derivation unit 62 derives an expected arrival time by dividing the distance by vehicle speed. In this case, the derivation unit 62 derives the time-wise imminency using the expected arrival time, in the same way as the time limit described above. Note that the derivation unit 62 may output the distance to an ECU that controls the automotive navigation system, and cause this ECU to derive the expected arrival time.

For example, when the notification information is information of "5 seconds left until exiting the operational design domain", "high" is derived as the time-wise imminency. Also, for example, when the notification information is information of "15 seconds left until exiting the operational design domain", "moderate" is derived as the time-wise imminency. Also, for example, when the notification information is information of "75 seconds left until exiting the operational design domain", "low" is derived as the time-wise imminency. Entry of the vehicle 10 into a region outside of the operational design domain means that the vehicle 10 switches from automated driving to manual driving.

Also, the derivation unit 62 derives the hazard level of the event based on the notification information acquired by the acquisition unit 60. The hazard level of the event according to the present embodiment represents how difficult it will be to continue automated driving of the vehicle 10. For example, the derivation unit 62 extracts words by performing natural language processing on the notification information, and derives the hazard level of an event correlated with these words. Note that the derivation unit 62 may derive the hazard level of the event by inputting the notification information into a trained model that is obtained in advance by machine learning. This trained model is, for example, a neural network model that takes notification information as input and outputs the hazard level of the event. Also, this trained model is obtained by machine learning using a set of notification information and correct answer data regarding the hazard level of the event as learning data.

For example, when the notification information is a notification of a change in weather that cause decrease in the performance of automated driving, such as "the weather will change from cloudy to rainy", "low" is derived as the hazard level of the event. Also, for example, when the notification information is a notification of a change in weather that will make continuing automated driving difficult, such as "the rain will rapidly become stronger", "moderate" is derived as the hazard level of the event. For example, when the notification information is notifying about a roadway condition that will make continuing automated driving difficult, such as "The road surface is frozen at the point of exiting the tunnel you are currently traveling in", "high" is derived as the hazard level of the event.

Also, when the notification information is for making notification regarding a failure of the vehicle 10, the hazard level of the event is derived in accordance with the severity of the failure.

In the present embodiment, notification information of which the urgency is "low", for example, is information in which automated driving can continue even without the driver acting in response to the notification information, such as the vehicle 10 side presenting the driver with information of overtaking a vehicle traveling ahead, or the like. Also, in the present embodiment, notification information of which the urgency is "moderate" is information that can be responded to in a state in which the driver is sitting in the driver's seat with a normal level of attention. Also, in the present embodiment, notification information of which the urgency is "high" is information that is difficult for the driver to respond to.

Examples of the notification information include information regarding the remaining charge of the battery that the vehicle 10 is equipped with, information regarding obstructions that are difficult to avoid, information regarding a failure in one side of a redundant system, information regarding a decrease in sensor performance, and so forth. Examples of notification information also include information relating to roadway objects, information relating to natural disasters such as earthquake early warnings, information relating to forks in the roadway, information relating to changes in the automated driving level, information relating to the remaining amount of fuel in the vehicle 10, and so forth.

The derivation unit 62 refers to the urgency data 32 and derives the urgency corresponding to the derived combination of the time-wise imminency and the hazard level of the event. Note that the derivation unit 62 may derive the urgency by summing scored values of each of the time-wise imminency and the hazard level of the event, or by weighting either of them and then summing.

The notification control unit 64 performs control to notify the mobile terminal 14 of notification information by varying the range that is controllable by the driver until a predetermined condition is satisfied, in accordance with the urgency derived by the derivation unit 62. Also, the notification control unit 64 makes notification of the notification information by performing at least one of displaying the notification information on the touch panel 44 of the mobile terminal 14, outputting sound from the mobile terminal 14, and vibrating the mobile terminal 14.

Regarding notification information of which the urgency derived by the derivation unit 62 is a certain degree ("moderate" in the present embodiment) or higher, the notification control unit 64 performs control to make notification of the notification information in a state in which the mobile terminal 14 is controlled such that the driver cannot perform operation thereof until the driver performs a vehicle operation. Also, regarding notification information of which the urgency derived by the derivation unit 62 is a certain degree or higher, the notification control unit 64 performs control to make notification of the notification information in a state in which the mobile terminal 14 is controlled such that a confirmation button is displayed on the touch panel 44 of the mobile terminal 14, and until the driver presses the confirmation button, the driver cannot operate the mobile terminal 14 other than an operation to press the confirmation button.

Also, regarding notification information of which the urgency is a certain degree or higher, the notification control unit 64 increases the coverage rate of the notification information on the touch panel 44 of the mobile terminal 14 to be greater than the coverage rate of notification information of which the urgency is below the certain degree. Regarding notification information of which the urgency is below the certain degree, the notification control unit 64 performs control to make notification of the notification information in a state in which the mobile terminal 14 is controlled such that the driver can operate the mobile terminal 14 without the driver performing the vehicle operation. Regarding notification information of which the urgency is below the certain degree, the notification control unit 64 performs control to make notification of the notification information in a state in which the mobile terminal 14 is controlled such that the confirmation button is not displayed on the touch panel 44 of the mobile terminal 14, and the driver can perform all operations of the mobile terminal 14.

That is to say, examples of the range over which the driver can control the mobile terminal 14 until the condition that the driver performs vehicle operation or the condition that the driver presses the confirmation button is satisfied include the operable range of the mobile terminal 14, the coverage rate of notification information on the touch panel 44 of the mobile terminal 14, and so forth.

Figure 12:
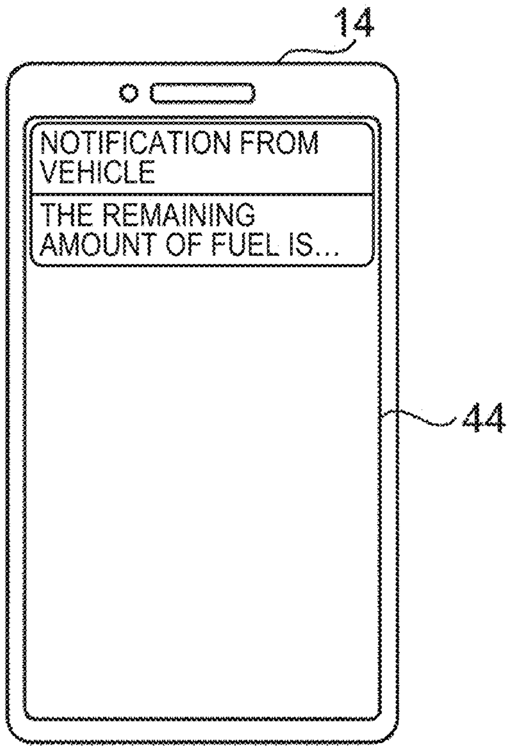
FIG. 12 is a diagram illustrating an example of a notification state of the mobile terminal.

Specifically, as illustrated in FIG. 12 as an example, with regard to notification information of which the urgency is "low", the notification control unit 64 performs control to make notification of the notification information to the mobile terminal 14 in a state in which the notification information is displayed on a part of the touch panel 44 of the mobile terminal 14, and operations other than confirming the notification information on the mobile terminal 14 can be performed even before the driver confirms this notification information. Although FIG. 12 illustrates an example in which the notification information is displayed on the top of the touch panel 44 of the mobile terminal 14, the disclosed technology is not limited to this form. For example, the notification information may be displayed at the middle portion, the bottom, or the like, of the touch panel 44 of the mobile terminal 14.

Figure 13:
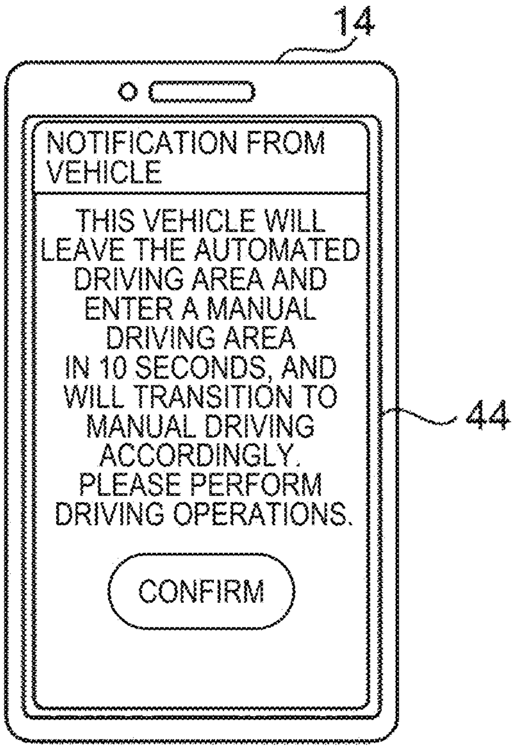
FIG. 13 is a diagram illustrating an example of a notification state of the mobile terminal.

Also, as an example, as illustrated in FIG. 13, with regard to notification information of which the urgency is "moderate" or "high", the notification control unit 64 performs control to make notification of the notification information to the mobile terminal 14 in a state in which the mobile terminal 14 is controlled such that the notification information is displayed on the entire face of the touch panel 44 of the mobile terminal 14, and until the driver presses the confirmation button, no operations other than the operation of pressing the confirmation button can be performed. FIG. 13 illustrates an example in which operations other than pressing the confirmation button cannot be performed on the mobile terminal 14 until the driver confirms the notification information by pressing the confirmation button.

Figure 14:
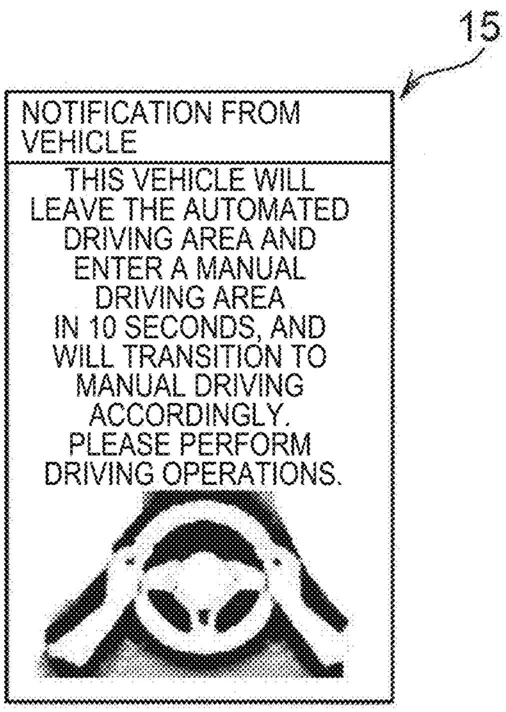
FIG. 14 is a diagram illustrating an example of a notification state of an in-vehicle display device.
Figure 15:
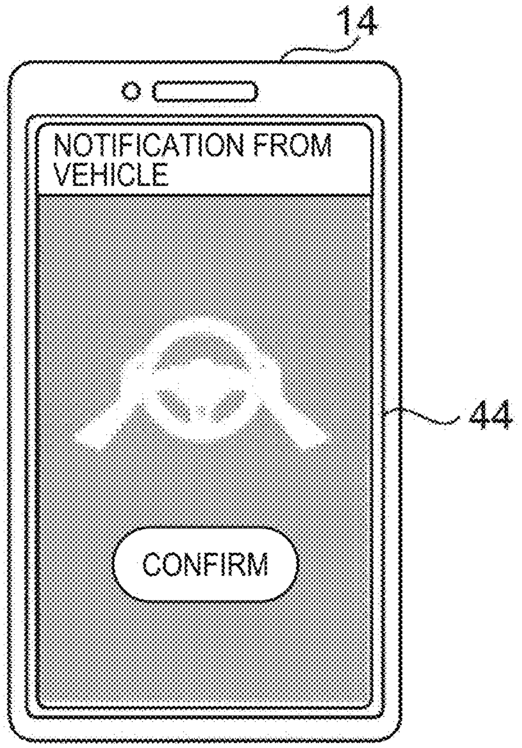
FIG. 15 is a diagram illustrating an example of a notification state of the mobile terminal.

Note that the notification control unit 64 may perform control to notify the display device 15 of notification information. Also, as illustrated in FIG. 14 as an example, the notification control unit 64 may control displaying an image indicating notification content on the display device 15, in addition to a text string indicating the notification content. Further, the notification control unit 64 may count down remaining time on a notification screen as time passes. Also, the display area of the touch panel 44 of the mobile terminal 14 is often smaller than the display area of the display device 15, and accordingly the notification control unit 64 may reduce the notification amount on the touch panel 44 of the mobile terminal 14, as compared to the notification amount on the display device 15. In this case, as illustrated in FIG. 15 as an example, the notification control unit 64 may perform control to notify the mobile terminal 14 of an icon indicating the notification content, without making notification of the text string indicating the notification content. Also, in this case, the notification control unit 64 may change the background color of the notification screen depending on the urgency. For example, the notification control unit 64 may set the background color to yellow when the urgency is "moderate" and may set the background color to red when the urgency is "high".

Further, the notification control unit 64 may perform control to make notification of the notification information such that the notification amount increases as the urgency increases. Examples of the notification amount include the number of devices that output notification information, the volume when notification of the notification information is made by sound, the duration of sound when notification of the notification information is made by sound, the amount of vibration when notification is made by vibration, the duration of vibration when notification of the notification information is made by vibration, and so forth.

For example, when the urgency is "moderate" or higher, the notification control unit 64 may perform control to make notification of the notification information such that the notification amount increases as the urgency increases. Specifically, when the urgency is "moderate", the notification control unit 64 performs control to display notification information on the entire face of the touch panel 44 of the mobile terminal 14. On the other hand, when the urgency is "high", the notification control unit 64 performs control to display the notification information on the entire face of the touch panel 44 of the mobile terminal 14, and also to output the notification information as audio from a speaker of the mobile terminal 14.

The operation of the mobile terminal 14 and the notification to the mobile terminal 14 may be performed on the screen of a particular application installed on the mobile terminal 14 by the user. When automated driving of Level 3 or higher is started, the notification control unit 64 may disregard notification impermissible settings in the application in mobile terminal 14 main unit side settings, and control the mobile terminal 14 main unit to enable notification. Alternatively, the main unit of the mobile terminal 14 may be controlled such that notifications of the application cannot be made impermissible.

Also, including the screen data to be displayed on the touch panel 44, in accordance with various situations, in the application in advance, and performing download thereof to the mobile terminal 14 in advance, enables the amount of communication on the mobile terminal 14 to be reduced, and time lag when making notification to the mobile terminal 14 can also be reduced.

Furthermore, even when notifications are permitted on the mobile terminal 14, a situation is conceivable in which the mobile terminal 14 is in silent mode (i.e., a state in which no notification sound is output when a notification is sent to the mobile terminal 14). In such a case, when the urgency is high or the urgency is moderate or higher, the notification control unit 64 may control the main unit of the mobile terminal 14 so as to emit a notification sound, regardless of whether the silent mode is set on the mobile terminal 14 side.

Further, the notification control unit 64 performs control such that notification of the notification information is made to the mobile terminal 14 carried by the driver, with different ending conditions for notification depending on the urgency. For example, with regard to notification information of which the urgency is less than a certain degree, the notification control unit 64 performs control to perform notification for as many times as set in advance, such as once or twice, or the like. On the other hand, with regard to notification information of which the urgency is no less than the certain degree, the notification control unit 64 performs control to repeatedly make notification of the notification information until the driver performs a vehicle operation such as an operation of gripping the steering wheel with his/her hand. Further, the notification control unit 64 performs control to repeatedly notify the notification information with regard to notification information of which the urgency is no less than a certain level until the driver presses the confirmation button displayed on the touch panel 44 of the mobile terminal 14. That is to say, the ending conditions for notification according to the present embodiment include the number of times of notification, the condition that the driver operates the vehicle, and the condition that the driver presses the confirmation button displayed on the touch panel 44 of the mobile terminal 14.

The notification control unit 64 generates notification control information including the range over which the driver can control the mobile terminal 14, the method of outputting notification information such as display, sound, vibration, and so forth, on the mobile terminal 14, and ending conditions, as described above. The notification control unit 64 then performs control to make notification of the notification information, by transmitting the notification information and the notification control information to the mobile terminal 14 via the wireless communication interface 23.

Figure 16:
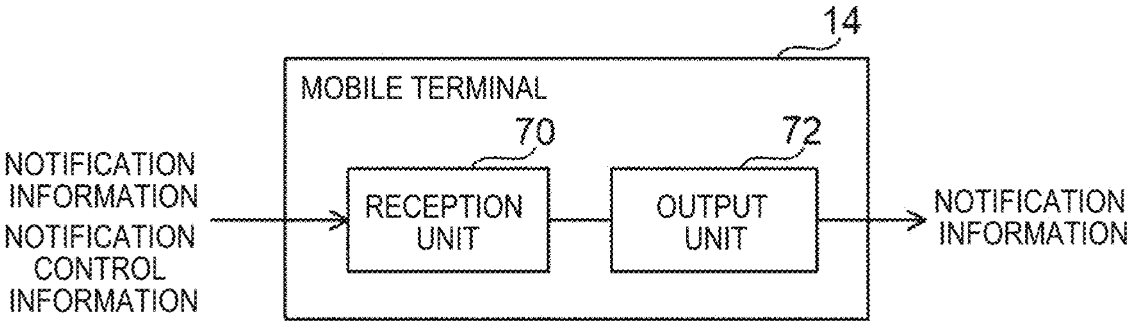
FIG. 16 is a block diagram illustrating an example of a functional configuration of the mobile terminal.

Next, a functional configuration of the mobile terminal 14 according to the present embodiment will be described with reference to FIG. 16. As illustrated in FIG. 16, the mobile terminal 14 includes a reception unit 70 and an output unit 72. The CPU 40 functions as the reception unit 70 and the output unit 72 by executing programs stored in the ROM 41.

The reception unit 70 receives the notification information and the notification control information transmitted from the vehicle control device 12 via the wireless communication interface 43.

The output unit 72 notifies the driver of the notification information by outputting the notification information in accordance with the notification control information received by the reception unit 70. That is to say, the driver continues to be notified until the ending condition included in the notification control information is satisfied.

Figure 17:
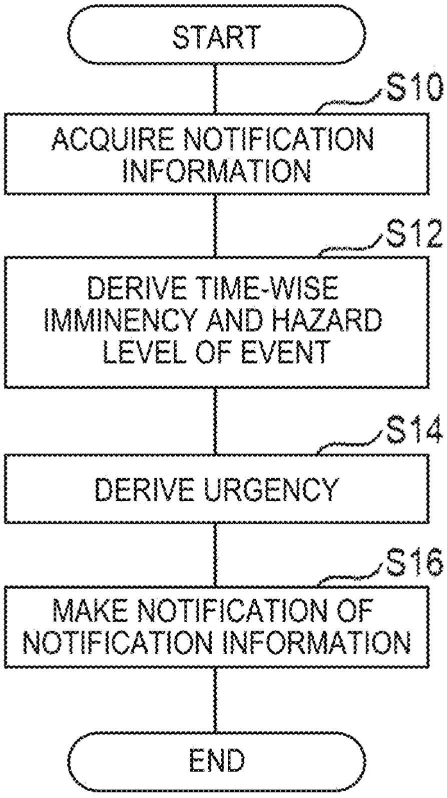
FIG. 17 is a flowchart showing an example of notification control processing executed by the vehicle control device.

Next, operations of the vehicle control device 12 according to the present embodiment will be described with reference to FIG. 17. Notification control processing that is shown in FIG. 17 is executed by the CPU 20 executing programs stored in the ROM 21. The notification control processing shown in FIG. 17 is executed, for example, when notification information is input to the vehicle control device 12 from another ECU via the in-vehicle communication interface 24 during execution of automated driving.

In step S10 of FIG. 17, the acquisition unit 60 acquires the notification information via the in-vehicle communication interface 24. In step S12, the derivation unit 62 derives the time-wise imminency for the driver to respond during execution of automated driving, based on the notification information acquired in step S10, as described above. Also, as described above, the derivation unit 62 derives the hazard level of the event based on the notification information acquired in step S10.

In step S14, the derivation unit 62 refers to the urgency data 32 and derives the urgency corresponding to a combination of the time-wise imminency and the hazard level of the event, derived in step S12. In step S16, as described above, control is performed to make notification of the notification information, by transmitting the notification information and the communication control information to the mobile terminal 14 via the wireless communication interface 23 in accordance with the urgency derived in step S14. Thus, the notification control unit 64 performs control to notify the mobile terminal 14 of notification information, varying the range controllable by the driver until a predetermined condition is satisfied, in accordance with the urgency derived by the derivation unit 62. Also, the notification control unit 64 thereby performs control such that notification of the notification information is made to the mobile terminal 14 carried by the driver, with different notification ending conditions in accordance with the urgency. When the processing of step S16 ends, the notification control processing ends. For example, when notification is made of notification information with a “high” urgency in step S16, the automated driving ECU 107 and so forth performs an MRM, and the state of the vehicle 10 transitions to an MRC.

Figure 18:
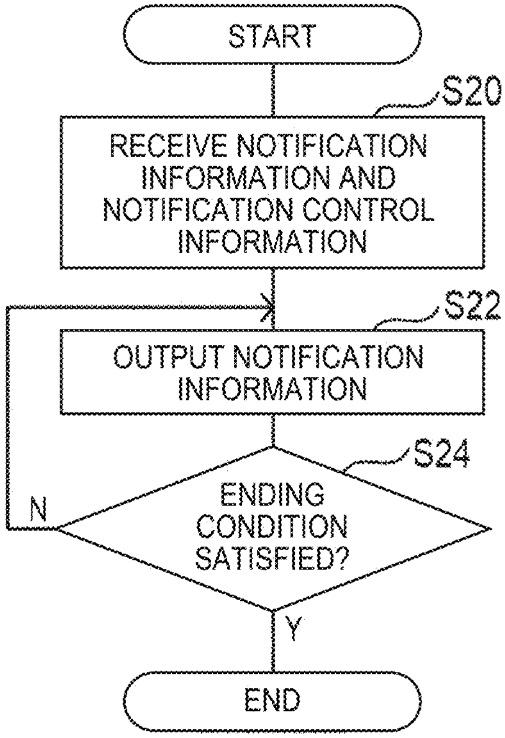
FIG. 18 is a flowchart showing an example of notification processing executed by the mobile terminal.

Next, operations of the mobile terminal 14 according to the present embodiment will be described with reference to FIG. 18. Notification processing that is shown in FIG. 18 is executed by the CPU 40 executing programs stored in the ROM 41. The notification processing shown in FIG. 18 is executed, for example, when the notification information and the notification control information are transmitted from the vehicle control device 12 to the mobile terminal 14 in step S16 described above.

In step S20 of FIG. 18, the reception unit 70 receives the notification information and the notification control information transmitted from the vehicle control device 12 via the wireless communication interface 43. In step S22, the output unit 72 outputs the notification information in accordance with the notification control information received in step S20, as described above. In step S24, the output unit 72 determines whether the ending condition included in the notification control information received in step S20 is satisfied. When this determination is a negative determination, the process returns to step S22, and when the determination is an affirmative determination, the notification processing ends.

As described above, according to the present embodiment, the driver of the vehicle 10 can be suppressed from overlooking important notifications relating to the vehicle 10.

Second Embodiment

Next, a second embodiment of the notification system 1 according to the present embodiment will be described, with description of portions that are redundant with the first embodiment being omitted or simplified.

Figure 19:
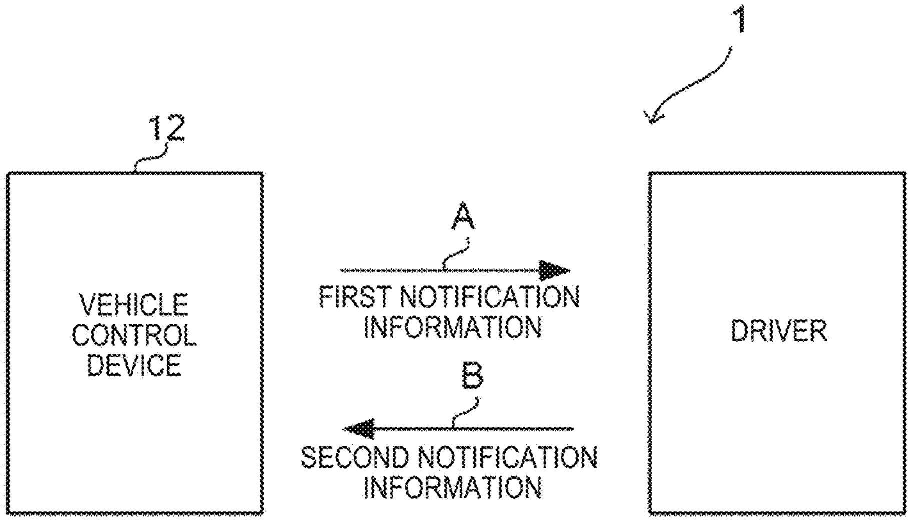
FIG. 19 is a diagram illustrating an example of directionality of notification information exchanged in the notification system.

FIG. 19 is a diagram illustrating an example of directionality of notification information exchanged in the notification system 1. An arrow A illustrated in FIG. 19 indicates notification information going from the vehicle control device 12 toward the driver of the vehicle 10. Here, the notification information from the vehicle control device 12 toward the driver is the notification information described in the first embodiment. In the second embodiment, the notification information from the vehicle control device 12 toward the driver is referred to as “first notification information”.

An arrow B illustrated in FIG. 19 indicates notification information going from the driver toward the vehicle control device 12. Now, in the second embodiment, the notification information going from the driver toward the vehicle control device 12 is referred to as “second notification information”. For example, the second notification information includes the biometric information of the driver, acquired via the mobile terminal 14, the in-cabin sensor 101, and so forth. The biometric information is information related to the driver, such as for example, the body temperature, blood pressure, pulse, electrical skin resistance, respiratory rate, behavior, and so forth, of the driver. The second notification information also includes operation information indicating contents of operations performed by the driver on the mobile terminal 14, the input device 106, and so forth. Further, the second notification information includes driver information indicating the state of the driver, such as whether the authority for driving can be turned over or cannot be turned over to the driver. For example, the vehicle control device 12 may acquire contents of utterances of the driver collected by a microphone included in the in-cabin sensor 101 as the second notification information, may acquire the above-described operation information and the driver information transmitted from the mobile terminal 14 as the second notification information, or the like. Thus, the vehicle control device 12 can comprehend the state of the driver based on the second notification information that is acquired. The vehicle control device 12 then changes the urgency, by setting at least one of the time-wise imminency and the hazard level of the event, based on the state of the driver that is comprehended. Note that examples of the state of the driver comprehended by the vehicle control device 12 and change in urgency will be described later.

Figure 20:
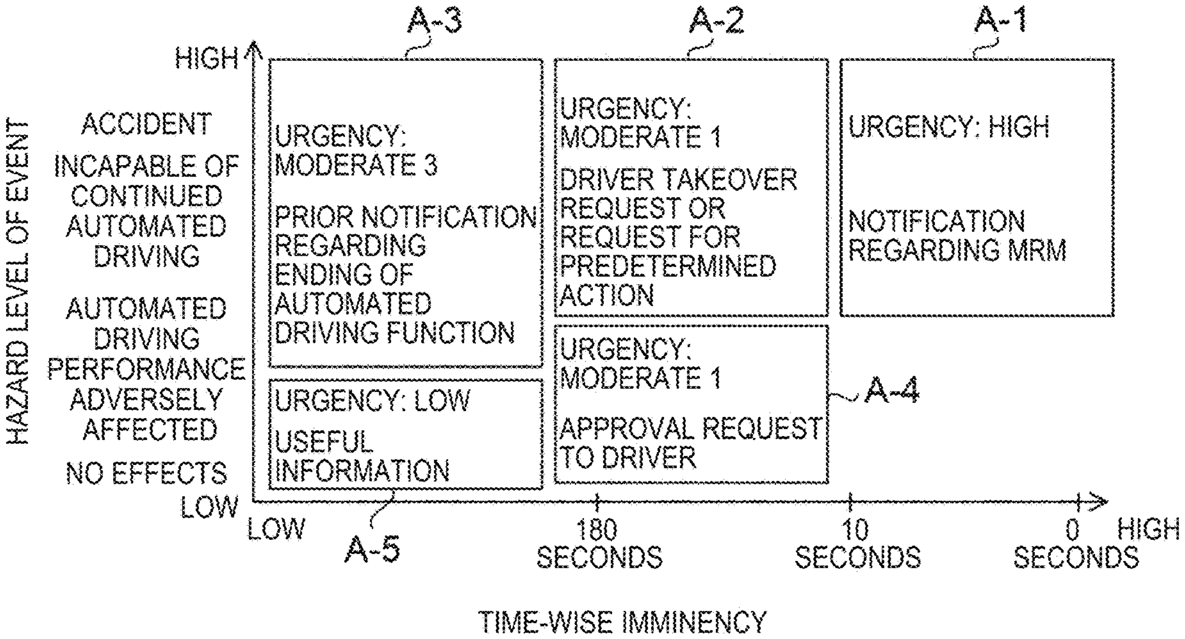
FIG. 20 is a diagram showing a first example of stratification of urgency.

FIG. 20 is a diagram showing a first example of stratification of urgency. Here, the urgency in the second embodiment represents the urgency of the response by the driver or the vehicle control device 12 during execution of automated driving. With respect to this urgency, the higher the time-wise imminency is, the higher the urgency is, and the higher the hazard level of an event is, the higher the urgency is, in the same way as in the first embodiment. FIG. 20 shows stratification of urgency of the response of the driver during execution of automated driving.

The stratification level of urgency in area A-1 shown in FIG. 20 is high. In this area A-1, both the time-wise imminency and the hazard level of the event are high. In this area A-1, the first notification information to be notified to the driver is a notification regarding an MRM, that the MRM will be executed, the MRM is being executed, or the like. The first notification information notifies the driver that the vehicle control device 12 suddenly no longer satisfies traveling environment conditions that are a prerequisite for controlling automated driving, or that a crucial system such as the actuator system 108 for controlling automated driving has malfunctioned. Although the urgency of the response of the driver in this area A-1 is high, there is not sufficient time for the driver to respond to the driver takeover request for turning over the primary entity for performing driving from the vehicle control device 12 to the driver, and accordingly the vehicle control device 12 does not request any response from the driver. In this case, for example, the vehicle control device 12 executes an MRM and attempts to park the vehicle 10 on the roadside, generates a notification regarding the MRM indicating that the MRM is being executed, and performs transmission thereof to the mobile terminal 14, as the first notification information. This enables the driver to comprehend that the MRM is being executed.

The stratification level of urgency in area A-2 shown in FIG. 20 is moderate 1. In this area A-2, the first notification information notified to the driver is a driver takeover request or a predetermined action request. This first notification information is notified to the driver when manual driving of the vehicle 10, which no longer satisfies the traveling environment conditions, can be performed. The above "no longer satisfies the traveling environment conditions" means, for example, when there is entry of the vehicle 10 to the outside of the operational design domain, when a failure of predetermined in-vehicle equipment is detected, or the like. Also, the above "when manual driving of the vehicle 10 . . . can be performed" means when there is no abnormality in the in-vehicle equipment necessary for manual operation, regardless of whether the driver is able to respond to the driver takeover request. In this case, the vehicle control device 12 generates, for example, a driver takeover request as first notification information and performs transmission thereof to the mobile terminal 14. Thus, the driver who can respond to the driver takeover request can comprehend that it is necessary to switch the vehicle 10 to manual driving.

As mentioned above, "no longer satisfies the traveling environment conditions" includes a case in which failure of predetermined in-vehicle equipment is detected. Here, failure of the predetermined in-vehicle equipment includes failure of the in-vehicle equipment in which a predetermined system function of the vehicle 10 becomes disabled. For example, when the in-vehicle equipment in which a failure has been detected is a driver monitoring camera included in the in-cabin sensor 101, a situation can occur in which the vehicle control device 12 is not capable of comprehending whether the driver is able to respond to a driver takeover request transmitted to the mobile terminal 14.

Note that in the above area A-2, the vehicle control device 12 may generate a predetermined action request as the first notification information, instead of the driver takeover request, and perform transmission thereof to the mobile terminal 14. The predetermined action request is, for example, a request for the driver to perform a predetermined action, such as gripping the steering wheel with his/her hand, looking up, or the like.

The stratification level of urgency in area A-3 shown in FIG. 20 is moderate 3. Here, moderate 3 has a lower urgency than moderate 1. Also, the time-wise imminency is low in this area A-3. In area A-3, the first notification information notified to the driver is a prior notification regarding ending of the automated driving function. The automated driving function is a function of the vehicle 10 for performing automated driving at automated driving Level 3 or higher, with the vehicle control device 12 serving as the primary entity for performing driving. Notification of this first notification information is made to the driver when ending of the automated driving function is detected to occur a certain period of time (for example, several minutes) later. In most cases, a situation in which notification of the first notification information is made to the driver is when the vehicle 10 nears the outside of the operational design domain that is set in advance. In this situation, there is sufficient time before the primary entity of driving is turned over to the driver. Accordingly, the vehicle control device 12 generates, as first notification information, a preliminary notification indicating that the automated driving function will end after a certain period of time, and performs transmission thereof to the mobile terminal 14, for example. This enables the driver to comprehend that the automated driving function will end after a certain period of time.

The stratification level of urgency in area A-4 shown in FIG. 20 is moderate 1. In this area A-4, the first notification information notified to the driver is an approval request to the driver. Notification of the first notification information is made to the driver at a notification timing that is set in advance, with respect to the automated driving function. In this case, before starting to execute a predetermined automated driving function, the vehicle control device 12 requests the driver to approve the execution of the automated driving function. For example, the vehicle control device 12 generates an approval request for execution of a predetermined automated driving function as first notification information and performs transmission thereof to the mobile terminal 14. Thus, the driver can comprehend the automated driving function scheduled to be executed, and when necessary, can approve the execution of the automated driving function.

Note that the above predetermined automated driving function may be part of the automated driving function inputted in advance by the driver, in accordance with at least one of preferences and characteristics of the driver. Also, in the situation of this area A-4, the vehicle control device 12 may execute a predetermined automated driving function without obtaining approval of the driver, generate a notification indicating that the automated driving function is being executed as first notification information, and perform transmission thereof to the mobile terminal 14.

The stratification level of urgency in area A-5 shown in FIG. 20 is low. In this area A-5, both the time-wise imminency and the hazard level of the event are low. In this area A-5, the first notification information to be notified to the driver is non-urgent but useful information for the driver, such as remaining fuel level or charge level, information regarding relatively distant routing decisions, and so forth. The first notification information is notified to the driver when useful information is acquired. In this case, the vehicle control device 12 generates, for example, useful information indicating the remaining fuel level as the first notification information and performs transmission thereof to the mobile terminal 14. This enables the driver to comprehend the remaining fuel level.

FIG. 21A is a diagram showing examples of first notification information corresponding to each area of A-1 to A-2 in FIG. 20, examples of events regarding which notification of the first notification information is made, and examples of actions of users, drivers in particular, that are required in response to the first notification information that is notified thereto. FIG. 21B is a diagram showing examples of first notification information corresponding to each area of A-3 to A-5 in FIG. 20, examples of events regarding which notification of the first notification information is made, and examples of actions of users, drivers in particular, that are required in response to the first notification information that is notified thereto.

As shown in FIG. 21A, an example of an event regarding which notification of the first notification information corresponding to area A-1 is made is, for example, "brake system or steering system is disabled". For example, assumption will be made that the vehicle control device 12 detects that the brake system 111 included in the actuator system 108 connected to the automated driving ECU 107 has become disabled. In this case, the vehicle control device 12 transmits a notification regarding an MRM to the mobile terminal 14 as first notification information. The action of the driver required for this first notification information is "none". That is to say, the driver does not need to take any action when notification of this first notification information is made.

As shown in FIG. 21A, an example of an event for which notification of the first notification information corresponding to area A-2 is made is, for example, "detection of approaching emergency vehicle". For example, assumption will be made that the vehicle control device 12 detects that an emergency vehicle is approaching the vehicle 10, based on information from the external sensor 100. In this case, the vehicle control device 12 transmits a driver takeover request or a predetermined action request, as first notification information, to the mobile terminal 14. The action required of the driver in response to the first notification information is, for example, switching from automated driving to manual driving and resuming the manual driving mode by performing a predetermined operation on the input device 106. Also, in this case, the driver may execute fallback driving such as stopping the vehicle 10 on the roadside in the resumed manual driving mode, in order to attain the MRC.

As shown in FIG. 21B, an example of an event for which the first notification information corresponding to area A-3 is notified is, for example, "traveling environment conditions will no longer be satisfied in the near future", such as detection of an obstruction on the roadway 10 km away, or a severe weather change within 10 minutes. For example, assumption will be made that the vehicle control device 12 detects, based on information from the cloud server 16, that the weather will change drastically within 10 minutes. In this case, the vehicle control device 12 transmits prior notification regarding ending of the automated driving function to the mobile terminal 14 as first notification information. The action of the driver that is required in response to the first notification information is, for example, to prepare to resume the manual driving mode by gripping the steering wheel with his/her hand, or the like.

As shown in FIG. 21B, an example of an event for which notification of the first notification information corresponding to area A-4 is made is, for example, a "proposal from the vehicle control device 12", such as overtaking or passing, or the like. For example, the vehicle control device 12 proposes, to the driver, overtaking a vehicle traveling ahead, as a predetermined automated driving function. In this case, before starting to execute overtaking of the vehicle traveling ahead, the vehicle control device 12 transmits an approval request to the mobile terminal 14 as first notification information, requesting the driver to approve the execution of the automated driving function related to overtaking the vehicle traveling ahead. The action of the driver that is required in response to the first notification information is, for example, a reply to the proposal from the vehicle control device 12, such as performing a predetermined operation on the mobile terminal 14.

As shown in FIG. 21B, an example of an event for which notification of the first notification information corresponding to area A-5 is made is, for example, "detection of fork 10 km ahead". For example, assumption will be made that the vehicle control device 12 detects that there is a fork 10 km ahead, based on surroundings information from the automotive navigation system, the map data 102, and so forth. In this case, the vehicle control device 12 transmits useful information to the mobile terminal 14 as first notification information. The action of the driver required for this first notification information is "none". That is to say, the driver does not need to take any action when notification of this first notification information is made.

Figure 22:
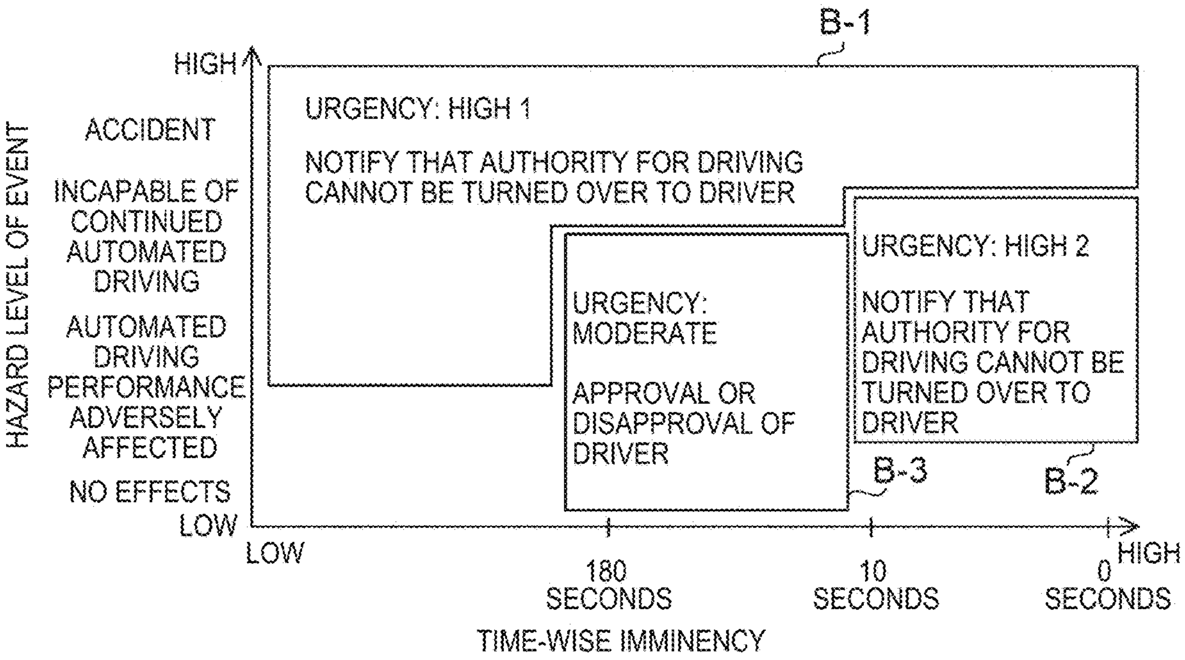
FIG. 22 is a diagram showing a second example of stratification of urgency.

FIG. 22 is a diagram showing a second example of stratification of urgency. FIG. 22 shows stratification of urgency of the response of the vehicle control device 12 during execution of automated driving.

The stratification level of urgency in area B-1 shown in FIG. 22 is high 1. The second notification information in the area B-1 is for notifying the vehicle control device 12 that authority for driving cannot be turned over to the driver. In other words, the second notification information notifies the vehicle control device 12 that the driver is unable to perform dynamic tasks of "recognition, judgment, and operation"

that is demanded of the driver when driving (dynamic driving tasks). Notification of the second notification information is made to the vehicle control device 12 when the driver, who is suffering an acute disorder, impairment of consciousness, or the like, performs a predetermined operation on the mobile terminal 14, the input device 106, or the like. Here, the time-wise imminency and the hazard level of the event within the area B-1 change depending on the reason why authority for driving cannot be turned over to the driver, specifically, the state of the driver. For example, when the vehicle control device 12 comprehends that the state of the driver is an acute disorder such as a heart attack or a stroke, the vehicle control device 12 sets both the time-wise imminency and the hazard level of the event to high. Also, when the vehicle control device 12 determines that the state of the driver is lethargy, fatigue, gastrointestinal attack, or the like, the vehicle control device 12 sets the hazard level of the event to high. In the case above, the vehicle control device 12 sets the urgency to be higher when the state of the driver is an acute disorder, as compared to when the condition of the driver is lethargy, fatigue, gastrointestinal attack, or the like. Note that a method for the vehicle control device 12 to comprehend the state of the driver will be described later.

The stratification level of urgency in area B-2 shown in FIG. 22 is high 2. Here, high 2 has a lower urgency than high 1. The second notification information in this area B-2 is for notifying the vehicle control device 12 that authority for driving cannot be turned over to the driver. Notification of this second notification information is made to the vehicle control device 12 when the mobile terminal 14 estimates that authority for driving cannot be turned over to the driver. For example, the mobile terminal 14 estimates whether authority for driving cannot be turned over to the driver, based on the biometric information of the driver, operation information, and so forth. Also, after estimating that the authority for driving cannot be turned over to the driver, the mobile terminal 14 periodically estimates whether the authority for driving can be turned over to the driver, based on the biometric information of the driver, operation information, and so forth. Upon estimating that the authority for driving can be turned over to the driver, the mobile terminal 14 notifies the vehicle control device 12 of second notification information indicating that the authority for driving can be turned over to the driver.

The stratification level of urgency in area B-3 shown in FIG. 22 is moderate. In this area B-3, the second notification information notified to the vehicle control device 12 is the approval or disapproval of the driver with respect to the approval request from the vehicle control device 12. Notification of the second notification information is made to the vehicle control device 12 when the driver performs a predetermined reply operation as to the approval request on the mobile terminal 14, the input device 106, or the like. For example, the mobile terminal 14 notifies the vehicle control device 12 of operation information indicating the approval or disapproval of the driver with respect to the approval request as the second notification information. Note that this is not restrictive, and the vehicle control device 12 may acquire, as the second notification information, contents of utterances of the driver indicating approval or disapproval with respect to the approval request, which are collected by the microphone included in the in-cabin sensor 101.

FIG. 23 is a diagram showing second notification information corresponding to each area of B-1 to B-3 in FIG. 22, example of events regarding which notification of the second notification information is made, and examples of actions of the user, more particularly the driver, at the time of making notification of the second notification information.

As shown in FIG. 23, an example of an event for which notification of the second notification information corresponding to area B-1 is made, is that, for example, the driver is suffering from a "severe physical disorder" such as a stroke, a heart attack, or the like. For example, when the driver experiences symptoms of a stroke, such as paralysis of the limbs, numbness of the limbs, or the like, the driver performs a predetermined operation on an emergency switch (omitted from illustration) that is included in the input device 106. The emergency switch is a switch that, when a predetermined operation is performed, notifies the vehicle control device 12 that authority for driving cannot be turned over to the driver, as second notification information. Thus, the vehicle control device 12 can comprehend that authority for driving cannot be turned over to the driver.

Now, upon acquiring the second notification information from the emergency switch the vehicle control device 12 comprehends the state of the driver based on the following information. First, the vehicle control device 12 acquires the biometric information of the driver via the mobile terminal 14, the in-cabin sensor 101, or the like, and receives operation information indicating the contents of operations performed by the driver, via the mobile terminal 14, the input device 106, or the like. Next, when the biometric information and operation information are input, the vehicle control device 12 inputs the biological information of the driver and the operation information that have been acquired into a trained model that has been trained to output the state of the driver. The vehicle control device 12 then acquires the state of the driver that is output from the trained model, and comprehends the state of the driver. The trained model is stored in the ROM 21, for example.

The trained model described above is generated using a known machine learning algorithm, such as a neural network. The training data input to the machine learning algorithm can be created by manually associating combinations of biometric information and operation information corresponding to various states of the driver, such as stroke, heart attack, or the like, for example.

As shown in FIG. 23, an example of an event for which the second notification information corresponding to area B-2 is notified is, for example, "the mobile terminal 14, the in-cabin sensor 101, and so forth, detect predetermined biometric information of the driver, such as body temperature, blood pressure, pulse, electrical skin resistance, respiratory rate, behavior, and so forth". For example, assumption will be made that the mobile terminal 14 detects that the pulse rate per minute of the driver is 100 or more or less than 50. In this case, the mobile terminal 14 notifies the vehicle control device 12 of second notification information indicating that authority for driving cannot be turned over to the driver. The action of the driver at the time of making notification regarding this second notification information is "none". That is to say, the driver does not need to take any action to notify the vehicle control device 12 of the second notification information.

As shown in FIG. 23, an example of an event for which notification of the second notification information corresponding to area B-3 is made is, for example, a "reply to proposal from the vehicle control device 12", such as overtaking or passing, or the like. For example, assumption will be made that the mobile terminal 14 has acquired first notification information indicating an approval request for execution of an automated driving function related to overtaking a vehicle traveling ahead. In this case, the driver performs a predetermined reply operation indicating approval or disapproval of the approval request. The mobile terminal 14 then notifies the vehicle control device 12 of operation information indicating the approval or disapproval of the driver, as the second notification information. Thus, the vehicle control device 12 can comprehend the contents of the reply to the approval request regarding driving.

Note that in the embodiments described above, when the notification information is information of which the urgency is no lower than a certain degree, the notification control unit 64 may perform control to make notification of notification information so that a notification sound exclusively for notification from the vehicle 10 is output from the mobile terminal 14. In this case, the driver can easily comprehend that the notification is an important notification from the vehicle 10.

Also, in the embodiments described above, when the notification information is information of which the urgency is no lower than a certain degree, the notification control unit 64 may perform control to call out the name of the driver by speech, and thereafter make notification of the notification information. In this case, the name of the driver can be acquired by acquiring the name of the person in whose name the mobile terminal 14 is registered, or by having the driver perform input thereof in advance.

Also, in the embodiments described above, the notification control unit 64 may perform notification on the mobile terminal 14 in accordance with an order of priority of the first notification information generated at the mobile terminal 14 and the second notification information that is notification information regarding the vehicle 10 (arbitration of notification information). For example, the notification control unit 64 may set the order of priority in the order of notification information with a certain urgency or higher, notifications regarding incoming telephone calls to the mobile terminal 14/notifications regarding natural disasters such as earthquake early warnings/notifications of warnings to specific regions, notifications with urgency lower than the certain degree, and normal notifications to the mobile terminal 14 other than those above, in descending order. More specifically, notification information with moderate or higher urgency, or with high urgency, is related to the safety of the occupants, and accordingly the priority may be set higher than incoming telephone calls to the mobile terminal 14, notifications regarding natural disasters such as earthquake early warnings, and notifications of warnings to specific regions.

Also, in the embodiments described above, when the notification information is information of which the urgency is lower than the certain level, the notification control unit 64 may perform control in which notification of the notification information is made in different notification forms in accordance with the state of the driver and the state of operation of the mobile terminal 14 by the driver. In this case, when the driver is in a state of watching the touch panel 44 of the mobile terminal 14, such as when the driver is playing a game or the like using the mobile terminal 14, the notification control unit 64 may perform control in which notification of the notification information is made by controlling so that the notification information is displayed on the touch panel 44 of the mobile terminal 14. Also, when the driver is in a state of listening to sound output from the mobile terminal 14, such as when the driver is playing music or the like using the mobile terminal 14, the notification control unit 64 may perform control in which notification of the notification information is made by controlling so that audio output of the notification information made from the speaker of the mobile terminal 14. Also, when the driver is state of not using the mobile terminal 14, such as when the driver is sleeping or the like, the notification control unit 64 may perform control in which notification of the notification information is made by causing vibration of the mobile terminal 14, causing vibration of the seatbelt of the driver seat, or the like. The notification control unit 64 can distinguish the state of the driver and the state of operation of the mobile terminal 14 by the driver by acquiring information from the mobile terminal 14, analyzing images taken by a camera that performs shooting of the driver, such as a driver monitoring camera or the like, or using a device that is worn by the driver that acquires the biometric information of the driver, such as a smart watch, or the like.

Also, in the embodiments described above, the notification control unit 64 may make notification of the notification information to a notification device installed in the vehicle 10 at the same timing as the notification to the mobile terminal 14. Examples of the notification device in this case include the display device 15, a speaker installed in the vehicle 10, a seatbelt of the driver seat, and so forth. That is to say, the notification control unit 64 may make notification of the notification information by displaying on the display device 15, outputting sound from the in-vehicle speaker, vibration of the seat belt of the driver seat, and so forth, at the same timing as the notification to the mobile terminal 14. In this case, the notification control unit 64 may end the notification from the notification device installed in the vehicle 10 when the notification ending condition is satisfied.

Also, in the embodiments described above, when the driver has a plurality of mobile terminals 14, the notification control unit 64 may perform control to make notification of the notification information to two or more of the mobile terminals 14.

Also, in the embodiment described above, the mobile terminal 14 may include at least part of the functional units included in the vehicle control device 12.

Also, the processing that is performed by the CPU reading and implementing software (programs) in the above embodiments may be implemented by various types of processors other than the CPU. Examples of processors in this case include programmable logic devices (PLDs) of which the circuit configuration can be changed after manufacturing, such as field-programmable gate arrays (FPGAs), dedicated electric circuits and so forth that are processors having a circuit configuration specifically designed to perform specific processing, such as application-specific integrated circuits (ASICs), and so forth. Also, each type of processing may be carried out by one of these various types of processors, or may be carried out by a combination of two or more processors of the same type or different types (for example, a combination of multiple FPGAs, a combination of a CPU and an FPGA, and so forth) may be carried out. Also, the hardware structures of these various types of processors are, more specifically, electric circuits that are combinations of circuit elements such as semiconductor elements.

Also, in the embodiments described above, configurations are made in which various types of data are stored in the ROM or storage, but this is not restrictive. For example, the storage unit may be a recording moderate such as a compact disk (CD), a Digital Versatile Disk (DVD), Universal Serial Bus (USB) memory, or the like. In this case, the various types of programs, data, and so forth, will be stored in such recording media.

The notification system 1 according to the embodiments has been described above, but obviously can be implemented in various forms without departing from the spirit of the present disclosure.

What is claimed is:

1. A notification system comprising:

a mobile terminal configured to receive, and to perform notification of, notification information regarding a vehicle; and a vehicle control device that is configured to generate the notification information for a driver of the vehicle, and to transmit the notification information to the mobile terminal, wherein the vehicle control device includes one or more processors configured to perform control in which notification of the notification information is made to the mobile terminal, while varying a range of the mobile terminal that is controllable by the driver until a predetermined condition is satisfied, in accordance with an urgency of the notification information, by:

deriving the urgency of the notification information;

when the urgency is below a threshold, displaying the notification information on only a part of a touch panel of the mobile terminal while permitting all operations of the mobile terminal; and when the urgency is at or above the threshold:

displaying the notification information on an entire face of the touch panel together with a confirmation button; and controlling the mobile terminal so that no operation other than pressing the confirmation button is permitted until the confirmation button is pressed or a vehicle operation is performed by the driver.

2. The notification system according to claim 1, wherein the urgency is determined depending on whether the notification information is information that requires the driver to respond.

3. The notification system according to claim 1, wherein the urgency is determined in accordance with a hazard level of an event.

4. The notification system according to claim 1, wherein the one or more processors are configured to make notification on the mobile terminal, in accordance with an order of priority regarding first notification information that is the notification information and second notification information generated at the mobile terminal.

5. A vehicle control device, comprising one or more processors configured to:

acquire notification information relating to a vehicle, the notification information being transmitted toward a mobile terminal held by a driver of the vehicle; and perform control to make notification to the mobile terminal regarding the notification information while varying a range of the mobile terminal that is controllable by the driver until a predetermined condition is satisfied, in accordance with an urgency of the notification information, by:

deriving the urgency of the notification information;

when the urgency is below a threshold, displaying the notification information on only a part of a touch panel of the mobile terminal while permitting all operations of the mobile terminal; and when the urgency is at or above the threshold:

displaying the notification information on an entire face of the touch panel together with a confirmation button; and controlling the mobile terminal so that no operation other than pressing the confirmation button is permitted until the confirmation button is pressed or a vehicle operation is performed by the driver.

6. A notification method executed by a computer that makes up a notification system including a mobile terminal configured to receive, and to perform notification of, notification information regarding a vehicle, and a vehicle control device that is configured to generate the notification information for a driver of the vehicle, and to transmit the notification information to the mobile terminal, the notification method comprising:

performing control to make notification to the mobile terminal regarding the notification information while varying a range of the mobile terminal that is controllable by the driver until a predetermined condition is satisfied, in accordance with an urgency of the notification information, by:

deriving the urgency of the notification information;

when the urgency is below a threshold, displaying the notification information on only a part of a touch panel of the mobile terminal while permitting all operations of the mobile terminal; and when the urgency is at or above the threshold:

displaying the notification information on an entire face of the touch panel together with a confirmation button; and controlling the mobile terminal so that no operation other than pressing the confirmation button is permitted until the confirmation button is pressed or a vehicle operation is performed by the driver.

* * * * *